United States Patent [19]
Fujimura et al.

[11] Patent Number: 5,385,313
[45] Date of Patent: Jan. 31, 1995

[54] SEAT BELT RETRACTOR

[75] Inventors: Yoshiichi Fujimura, Shiga; Shizutaka Matsuura, Hikone, both of Japan

[73] Assignee: Takata Corporation, Tokyo, Japan

[21] Appl. No.: 8,309

[22] Filed: Jan. 25, 1993

[30] Foreign Application Priority Data

Jan. 30, 1992 [JP] Japan .................... 4-015383

[51] Int. Cl.$^6$ .................... B60R 22/38; B60R 22/40
[52] U.S. Cl. .................... 242/377
[58] Field of Search .................... 242/107, 107.1, 107.11, 242/107.12, 107.13, 107.14, 107.15, 107.4 R, 107.4 A, 107.4 B, 107.4 C, 107.4 D, 107.4E, 377, 397.2, 548, 615.3; 280/806, 808; 297/475, 476, 477, 478, 481

[56]         References Cited
            U.S. PATENT DOCUMENTS 4,372,613  2/1983  Kitakami et al. .................... 242/107
4,832,280  5/1989  Haland et al. .................... 242/107

FOREIGN PATENT DOCUMENTS 2064302  6/1981  United Kingdom .
2196832  5/1988  United Kingdom .

OTHER PUBLICATIONS

European search report, dated Mar. 25, 1993.

*Primary Examiner*—John M. Jillions
*Attorney, Agent, or Firm*—Armstrong, Westerman, Hattori, McLeland & Naughton

[57]            ABSTRACT

A seat belt retractor having a webbing guide (22) which slides along guide holes (2p and 2q) in side walls (2a and 2b) in accordance with the roll diameter of a webbing (3) taken up on a reel shaft (4), thereby allowing the webbing (3) to be wound up and unwound smoothly and also protected. Since guide portions (22d and 22e) abut on the upper end surfaces of the two side walls (2a and 2b) at all times, the webbing guide (22) will not rotate to tilt when the webbing (3) is wound up and unwound. Accordingly, the webbing guide (22) can slide smoothly along the guide holes (2p and 2q), and the webbing (3) can be wound up and unwound even more smoothly.

3 Claims, 27 Drawing Sheets

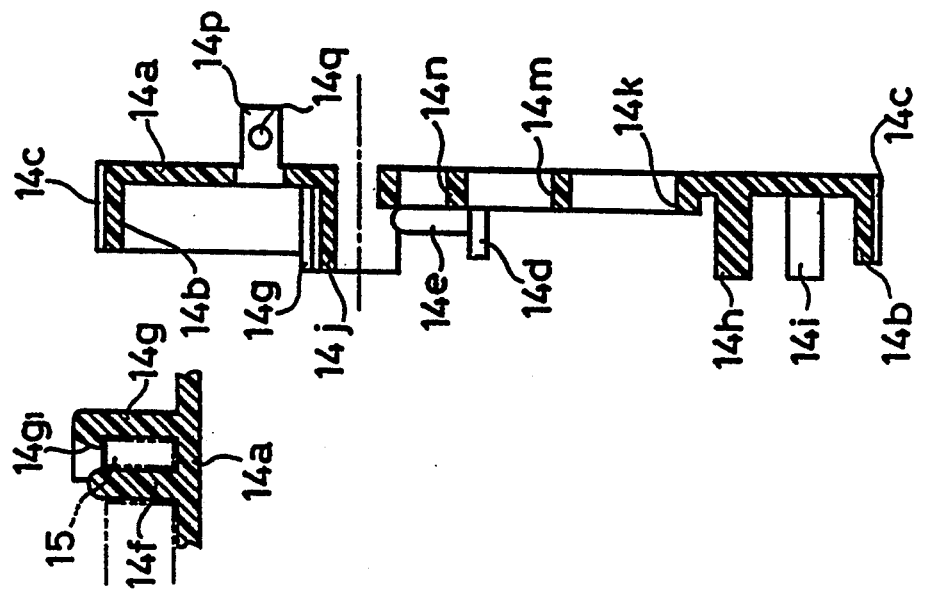
Fig. 16(c)
Fig. 16(b)
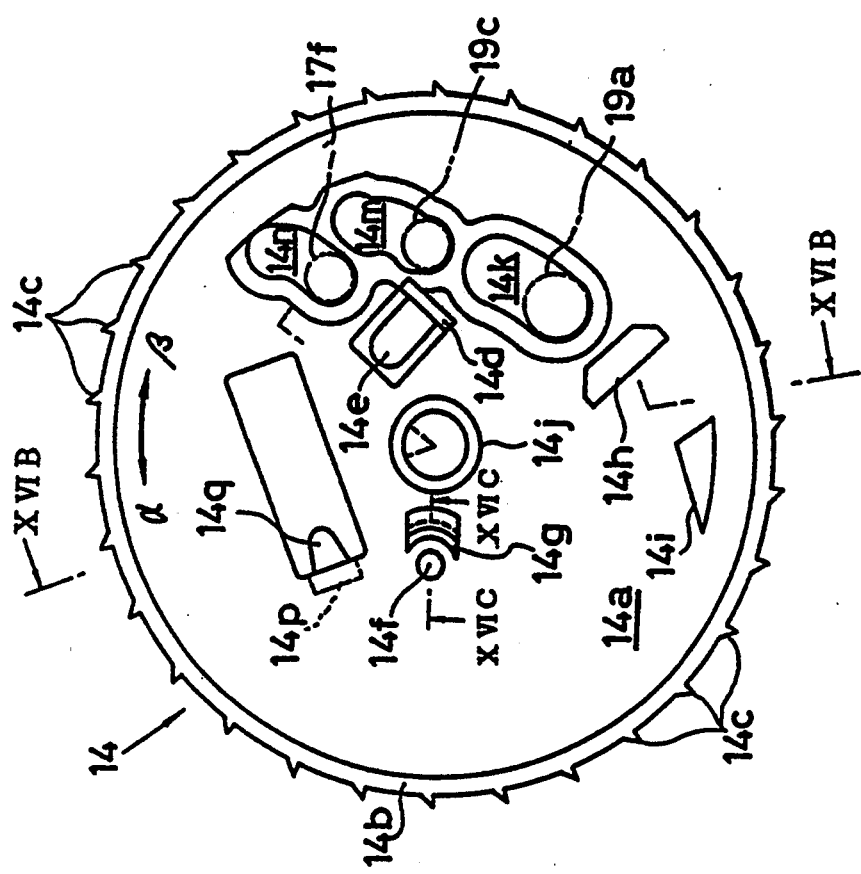
Fig. 16(a)

Fig. 17(a)
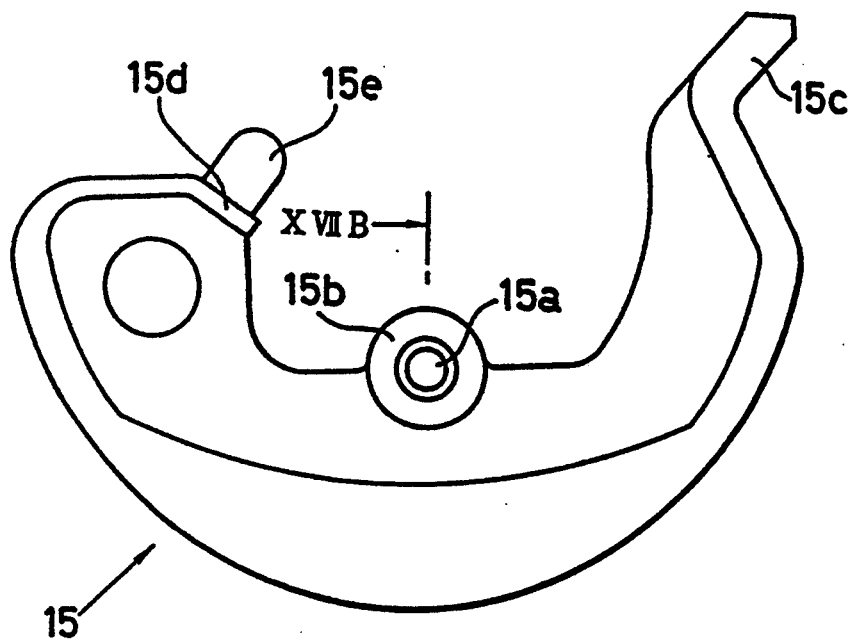
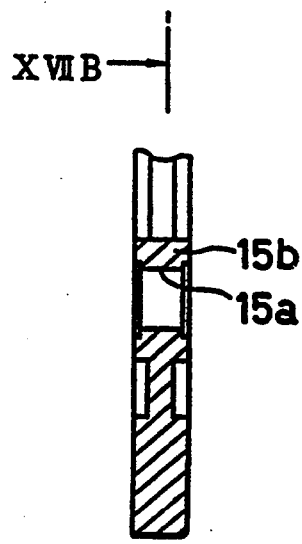
Fig. 17(b)

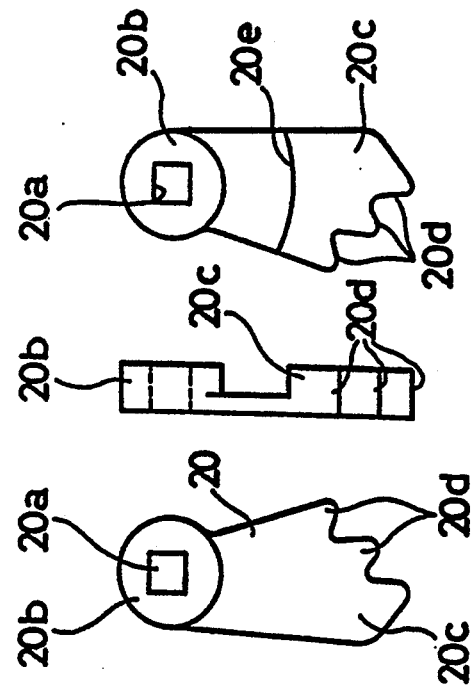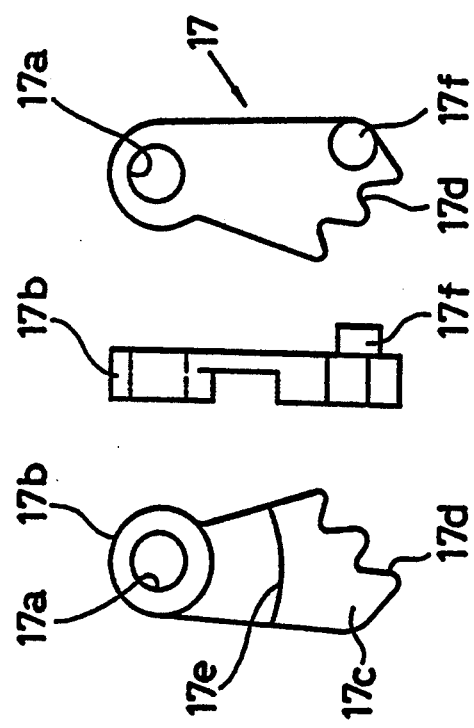

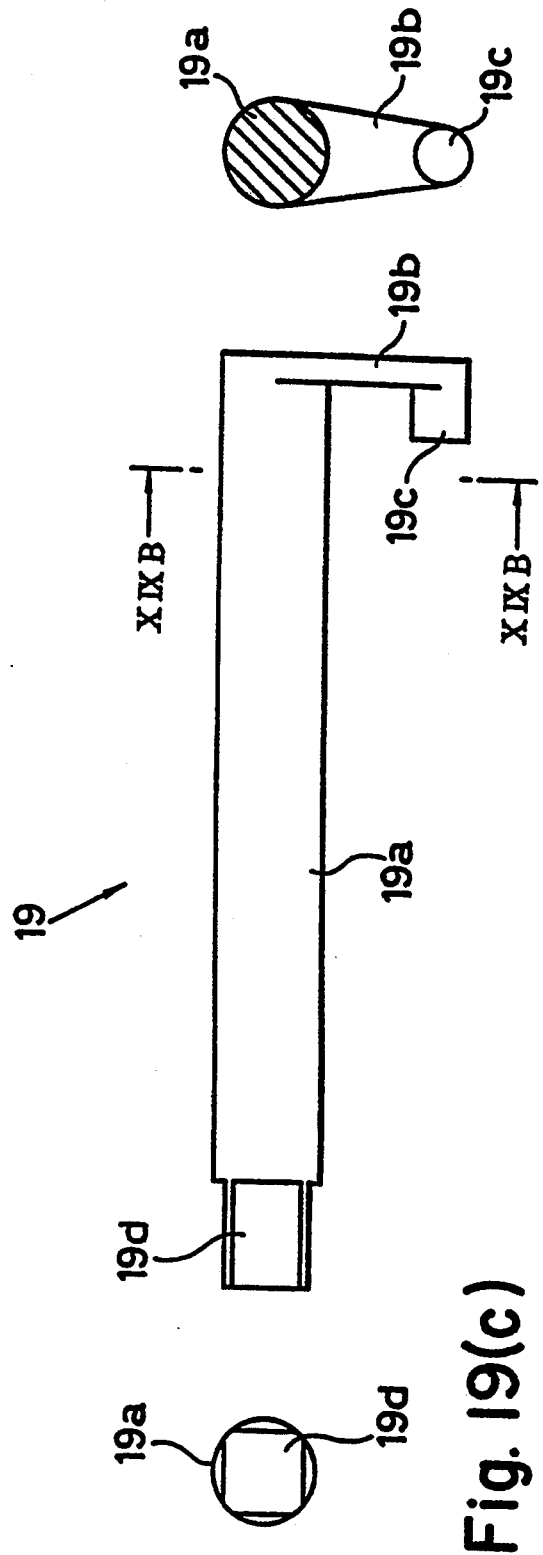

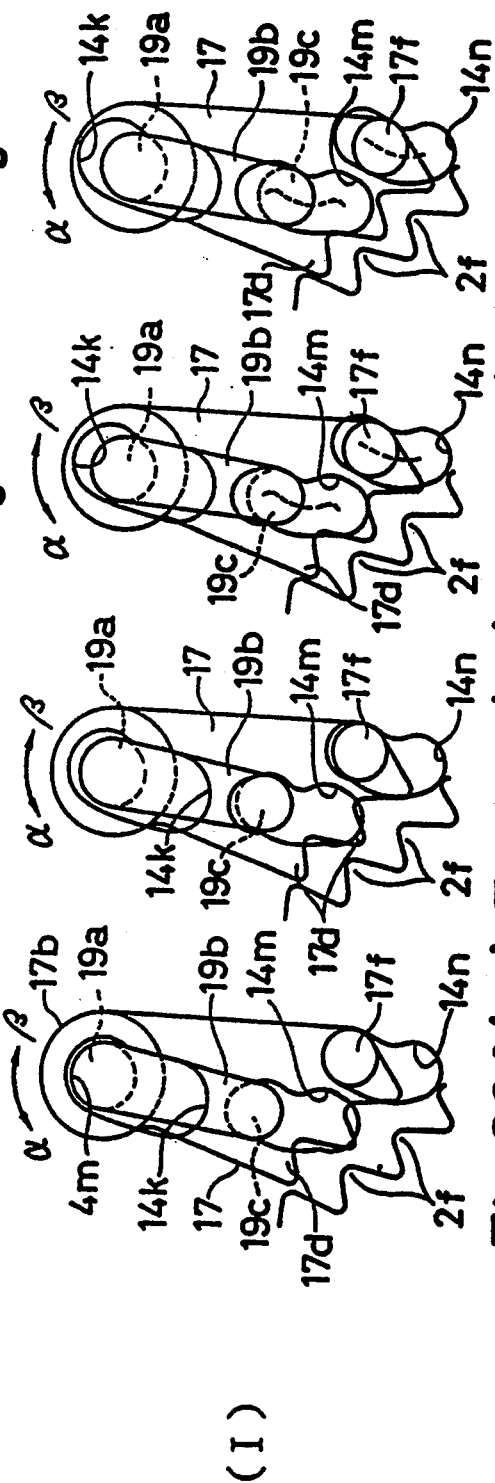
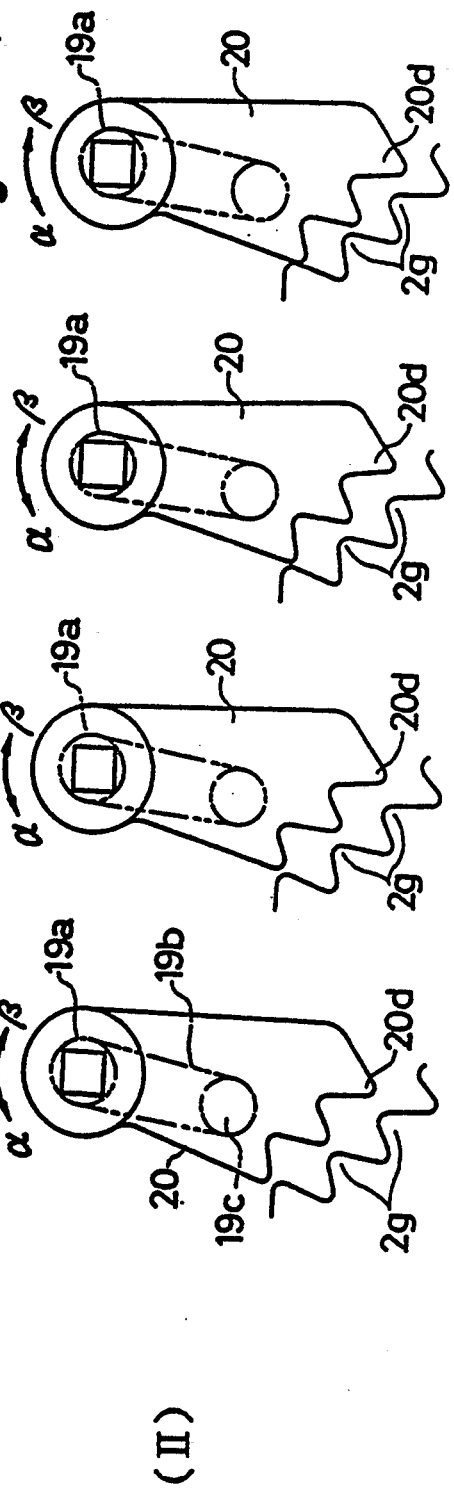

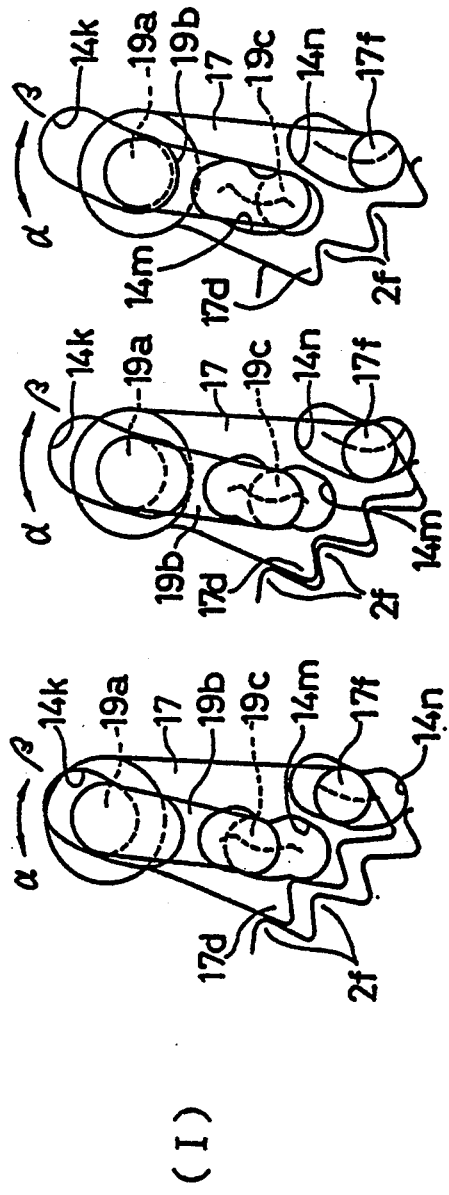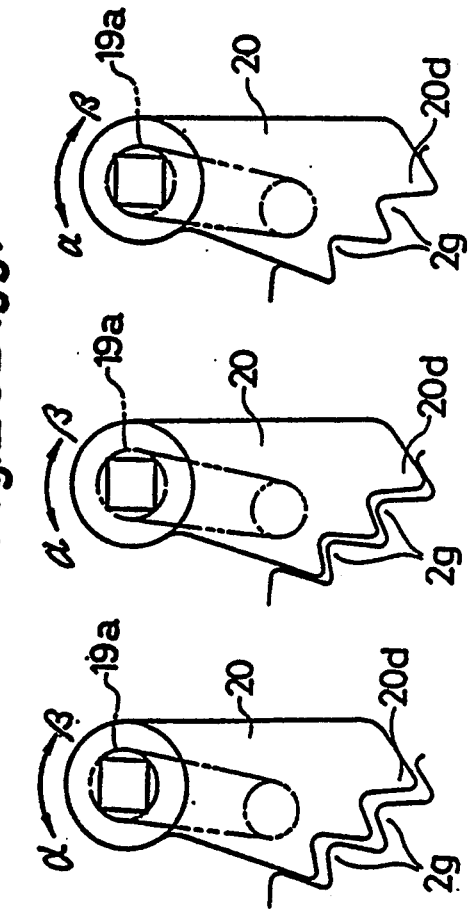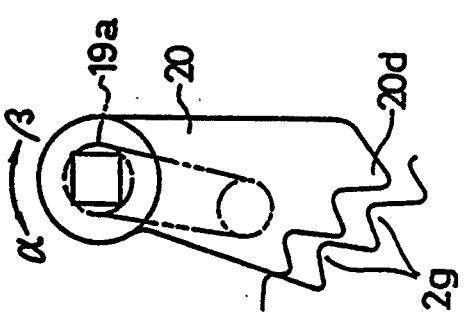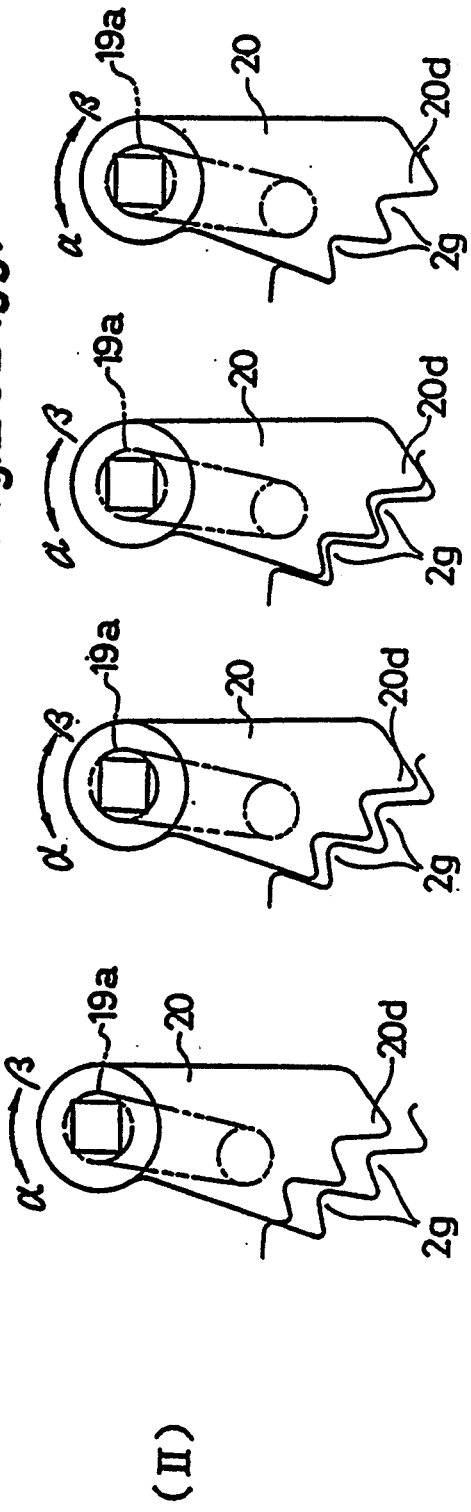

SEAT BELT RETRACTOR

BACKGROUND OF THE INVENTION

The present invention relates to a seat belt system that is provided on a vehicle, for example, an automobile, for the purpose of protecting an occupant. More particularly, the present invention relates to a seat belt retractor designed so that a reel shaft for winding up a webbing is locked from rotating when an emergency situation occurs, thereby preventing the webbing from being pulled out.

A typical conventional seat belt retractor mounted on a vehicle, for example, an automobile, includes a reel shaft for winding up a webbing, a frame rotatably supporting both ends of the reel shaft, lock means disposed in between the frame and the reel shaft and arranged to allow rotation of the reel shaft under normal circumstances and to be activated, when need arises, so as to prevent rotation of the reel shaft in at least a direction in which the webbing is unwound, deceleration sensing means operating when deceleration exceeding a predetermined value acts on the vehicle, and means for activating the lock means in response to the operation of the deceleration sensing means, as disclosed, for example, in the specification and drawings of U.S. Pat. No. 4,796,918.

In such a seat belt retractor, the reel shaft is freely rotatable under normal circumstances. Therefore, the webbing can be unwound freely, and the occupant can move forwardly as desired. When an emergency situation occurs, e.g., when a high degree of deceleration acts on the vehicle, the deceleration sensing means operates on sensing the deceleration, causing the lock activating means to activate the lock means so as to lock the reel shaft from rotating. Consequently, the webbing is prevented from being pulled out, and the occupant's body is restrained by the webbing. Thus, inertial forward movement of the occupant's body is prevented.

Incidentally, many of conventional seat belt retractors of the type described above are provided with a webbing guide that guides the webbing when wound up and unwound. In the prior art, the webbing guide is rigidly provided, extending between the left and right side walls of the frame.

However, the webbing guide, which is rigidly secured to the left and right side walls of the frame, involves the problem that since the position of the webbing guide is fixed at all times, the guide angle of the webbing with respect to the webbing guide undesirably changes as the webbing take-up position changes in accordance with the roll diameter of webbing taken up on the reel shaft. If the webbing guide angle changes in this way, the webbing cannot smoothly be guided by the webbing guide. In addition, the webbing may be rubbed against the webbing guide.

SUMMARY OF THE INVENTION

It is an object of the present invention to provide a seat belt retractor which is capable of smoothly winding and unwinding a webbing and of protecting the webbing reliably.

To attain the above-described object, the present invention provides a seat belt retractor for a vehicle including a reel shaft for winding up a webbing, a frame rotatably supporting both ends of the reel shaft, and lock means disposed in between the frame and the reel shaft and arranged to allow rotation of the reel shaft under normal circumstances and to be activated, when need arises, so as to prevent rotation of the reel shaft in at least a direction in which the webbing is unwound. The seat belt retractor further includes deceleration sensing means operating when deceleration exceeding a predetermined value acts on the vehicle, and means for activating the lock means in response to the operation of the deceleration sensing means. Further, the seat belt retractor includes a webbing guide for guiding the webbing. The webbing guide is provided on the frame so as to be movable in accordance with the change of a position at which the webbing extends outwardly from the frame and which changes in accordance with the roll diameter of the webbing taken up on the reel shaft.

Further, the present invention is characterized in that the webbing guide is provided with means for preventing the webbing guide from rotating relative to the frame about an axis intersecting perpendicularly to the planes of the left and right side walls.

In the seat belt retractor of the present invention, arranged as described above, the webbing take-up position changes in accordance with the roll diameter of the webbing taken up on the reel shaft when the webbing is wound up and unwound. However, since the webbing guide moves in accordance with the change of the webbing take-up position, the guide angle of the webbing with respect to the webbing guide is maintained at a substantially constant level irrespective of the change in the roll diameter of the webbing on the reel shaft. Accordingly, the webbing can be guided smoothly by the webbing guide, and there is substantially no possibility that the webbing will be rubbed against the webbing guide.

In addition, since the rotation preventing means prevents rotation of the webbing guide during the movement thereof, the guide angle of the webbing with respect to the webbing guide can be maintained at a constant level even more effectively.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8 is a view showing the reel shaft employed in the embodiment, in which

FIG. 9 is a view showing the reel shaft employed in the embodiment, in which

FIG. 11 is a view showing a spring casing employed in the embodiment, in which

FIG. 12 is a view showing a cover employed in the embodiment, in which

FIG. 16 is a view showing a lock gear employed in the embodiment, in which FIG. 16(a) is a side view of the lock gear as seen from the right-hand side thereof, FIG. 16(b) is a sectional view taken along the line XVIB—XVIB in FIG. 16(a), and FIG. 16(c) is a sectional view taken along the line XVIC—XVIC in FIG. 16(a).

FIG. 17 is a view showing an inertia member employed in the embodiment, in which FIG. 17(a) is a side view of the inertia member as seen from the left-hand side thereof, and FIG. 17(b) is a sectional view taken along the line XVIIB—XVIIB in FIG. 17(a).

FIG. 18 is a view showing a main pawl employed in the embodiment, in which FIG. 18(a) is a side view of the main pawl as seen from the left-hand side thereof, FIG. 18(b) is a front view of the main pawl, and FIG. 18(c) is a side view of the main pawl as seen from the right-hand side thereof.

FIG. 19 is a view showing a joint pin employed in the embodiment, in which FIG. 19(a) is a front view of the joint pin, FIG. 19(b) is a sectional view taken along the line XIXB—XIXB in FIG. 19(a), and FIG. 19(c) is a side view of the joint pin as seen from the left-hand side thereof.

FIG. 20 is a view showing a backup pawl employed in the embodiment, in which FIG. 20(a) is a side view of the backup pawl as seen from the left-hand side thereof, FIG. 20(b) is a front view of the backup pawl, and FIG. 20(c) is a side view of the backup pawl as seen from the right-hand side thereof.

FIG. 21 is a view showing a lock gear second cover employed in the embodiment, in which

FIG. 23 is a view showing a casing, a lever and a pawl of the deceleration sensing means, in which

FIG. 24 is a view showing an inertia member of the deceleration sensing means, in which

FIG. 25 is a view showing a webbing guide employed in the embodiment, in which

FIG. 26A illustrates one part of the operation of the main and backup pawls in the embodiment.

FIG. 26B illustrates the other part of the operation of the main and backup pawls in the embodiment.

DESCRIPTION OF THE PREFERRED EMBODIMENTS

Figure 1A:
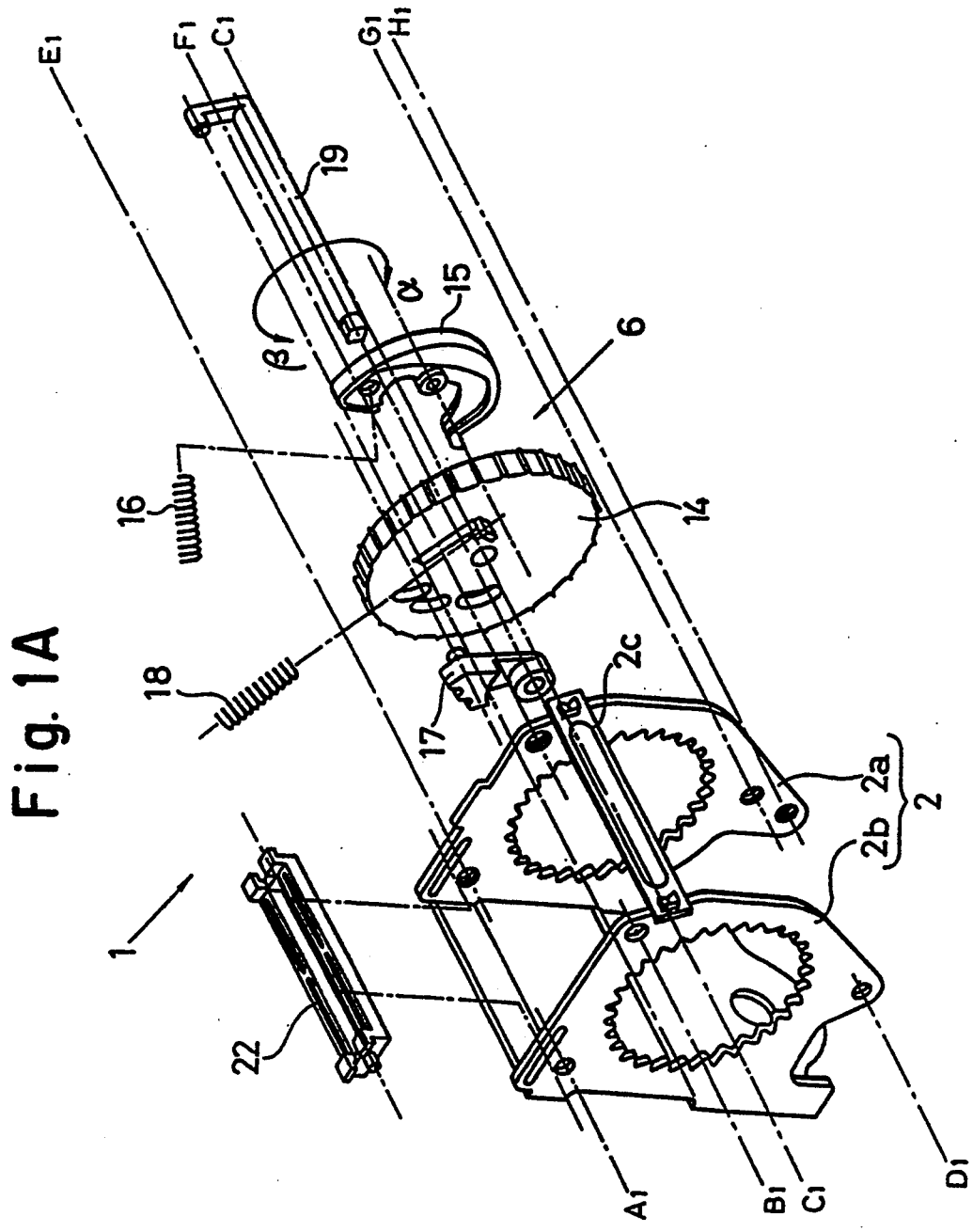
FIG. 1A is an exploded perspective view of a central portion of one embodiment of the seat belt retractor according to the present invention.
Figure 1B:
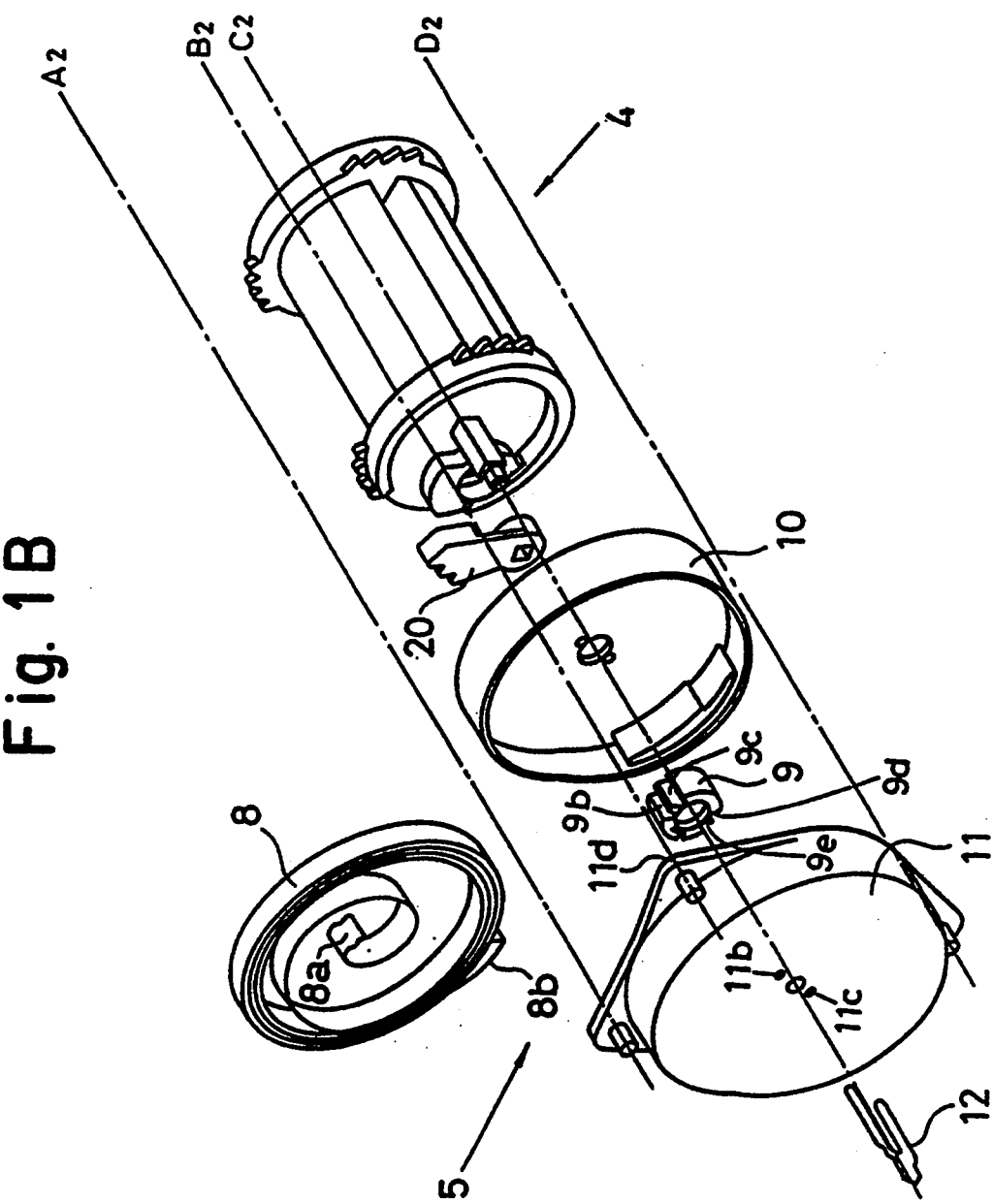
FIG. 1B is an exploded perspective view of a left-hand portion of the embodiment of the seat belt retractor according to the present invention.
Figure 1C:
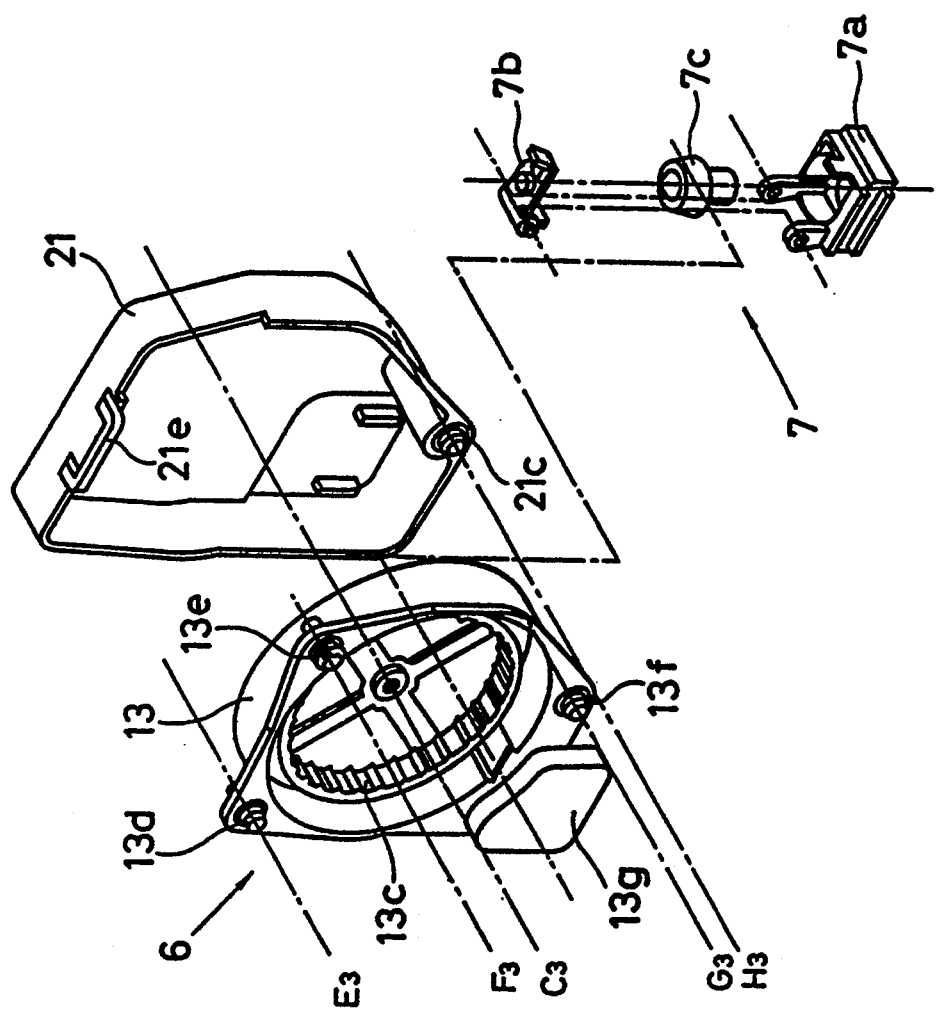
FIG. 1C is an exploded perspective view of a right-hand portion of the embodiment of the seat belt retractor according to the present invention.
Figure 2:
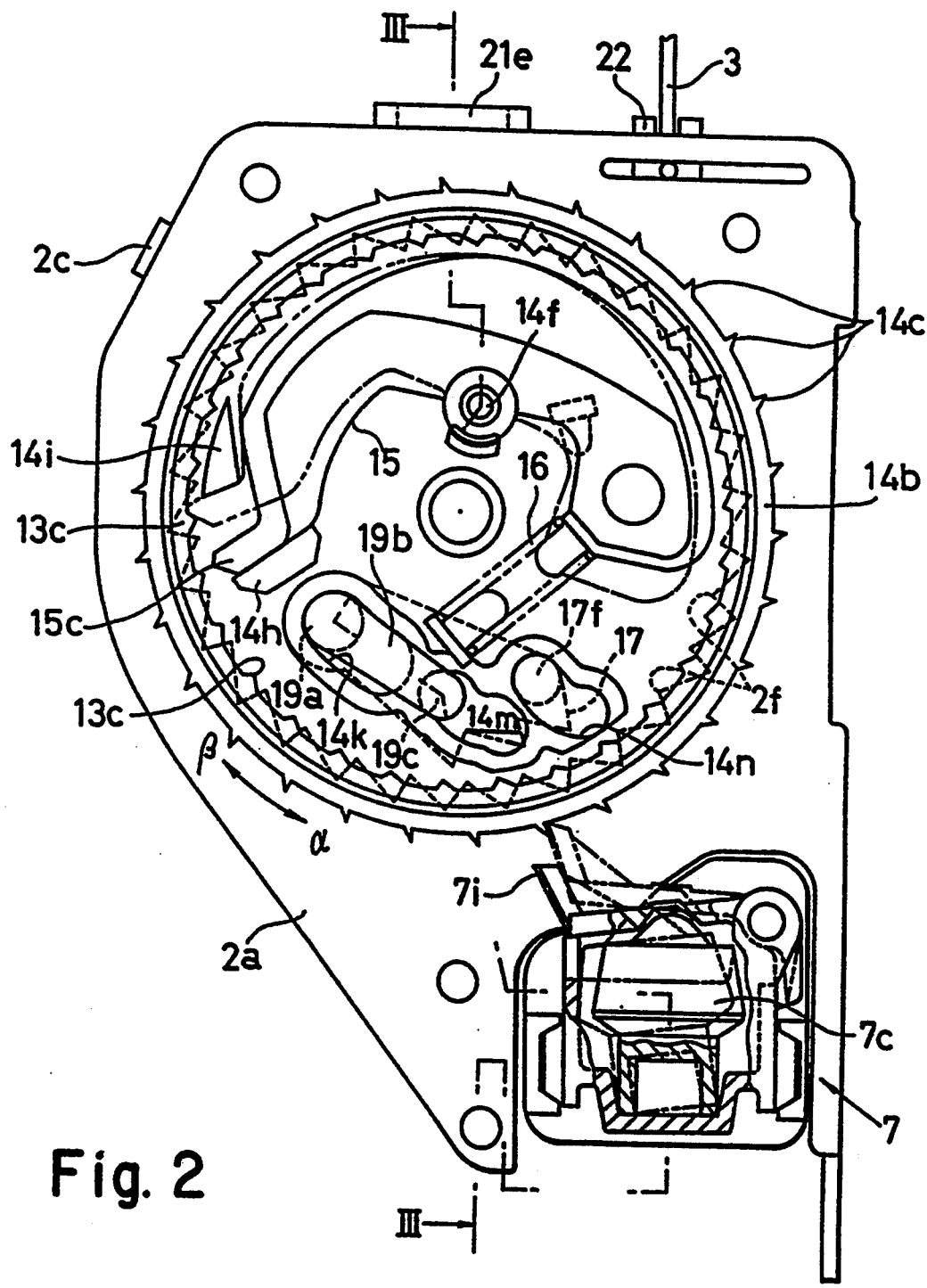
FIG. 2 is a side view of the seat belt retractor of the embodiment in an assembled state, as seen from the right-hand side thereof, with a cover removed therefrom.
Figure 3:
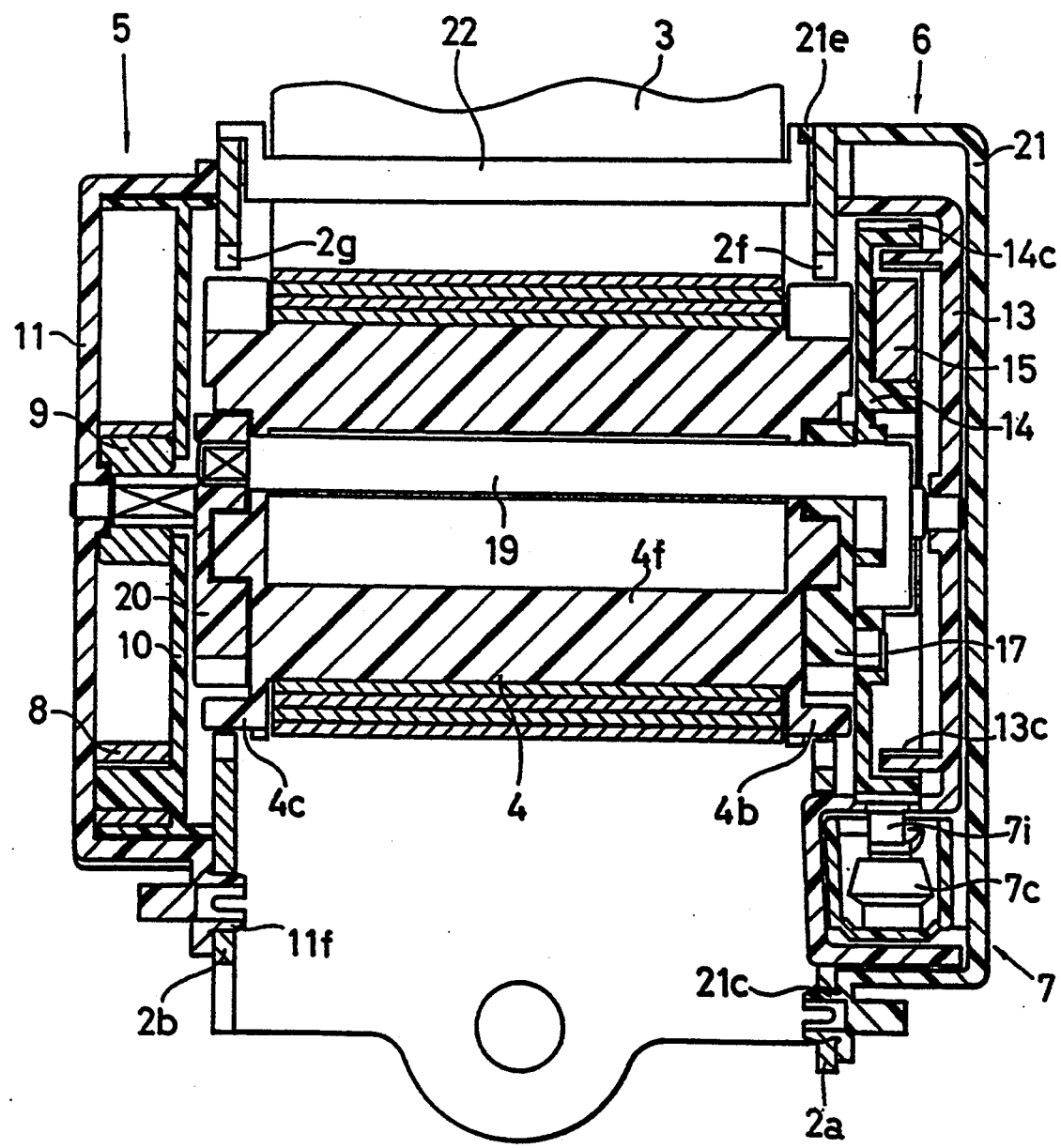
FIG. 3 is a sectional view taken along the line III—III in FIG. 2, showing the assembled state of the seat belt retractor of the embodiment.
Figure 4:
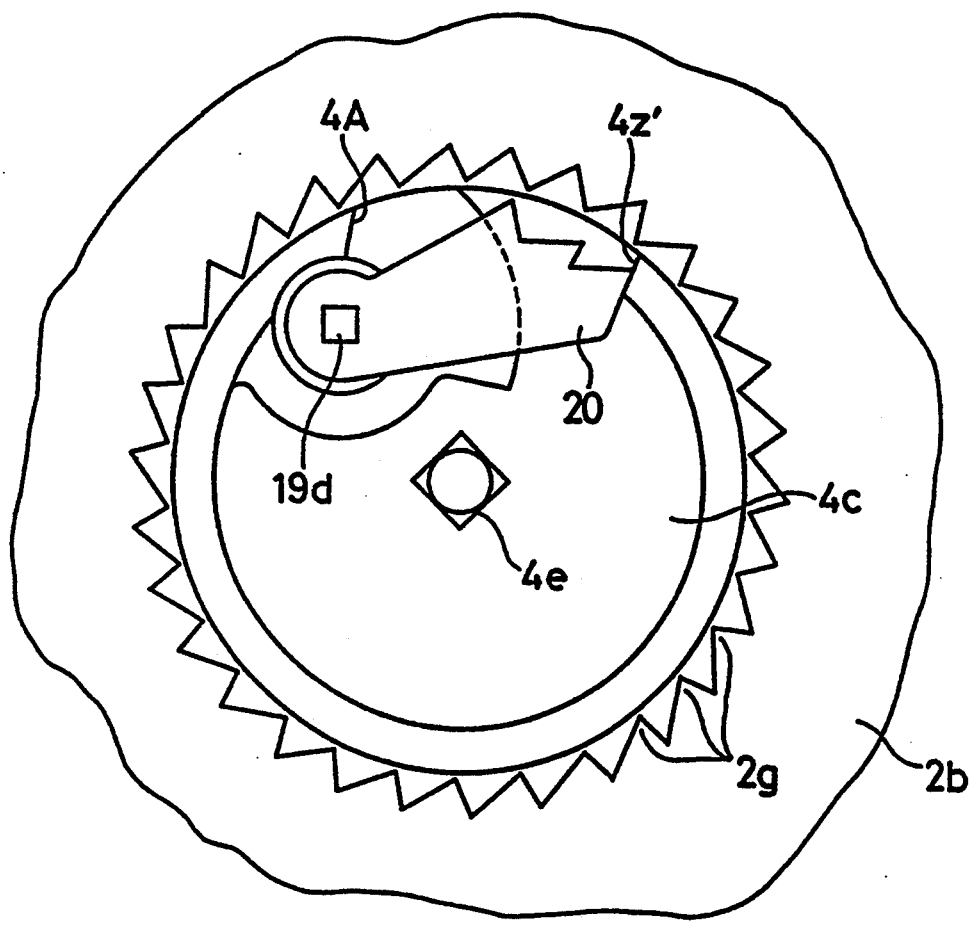
FIG. 4 is a fragmentary side view of the arrangement shown in FIG. 3, as seen from the left-hand side thereof, with a biasing force application means removed therefrom.

FIGS. 1A to 1C are exploded perspective views showing one embodiment of the seat belt retractor according to the present invention. FIG. 1A shows a central portion of the embodiment, while FIG. 1B shows a left-hand portion thereof, and FIG. 1C shows a right-hand portion thereof. An exploded perspective view showing the whole of the embodiment is formed by combining together FIGS. 1A, 1B and 1C with the imaginary lines $A_1$, $B_1$, $C_1$ and $D_1$ in FIG. 1A matched with the imaginary lines $A_2$, $B_2$, $C_2$ and $D_2$ in FIG. 1B, respectively, and with the imaginary lines $E_1$, $F_1$, $C_1$, $G_1$ and $H_1$ in FIG. 1A matched with the imaginary lines $E_3$, $F_3$, $C_3$, $G_3$ and $H_3$ in FIG. 1C, respectively. FIGS. 2 to 4 show the seat belt retractor of this embodiment which is in an assembled state. FIG. 2 is a side view of the seat belt retractor as seen from the right-hand side thereof with a cover removed therefrom. FIG. 3 is a sectional view taken along the line III—III in FIG. 2. FIG. 4 is a fragmentary side view of the arrangement shown in FIG. 3, as seen from the left-hand side thereof with a biasing force application means 5 removed therefrom.

Figure 5:
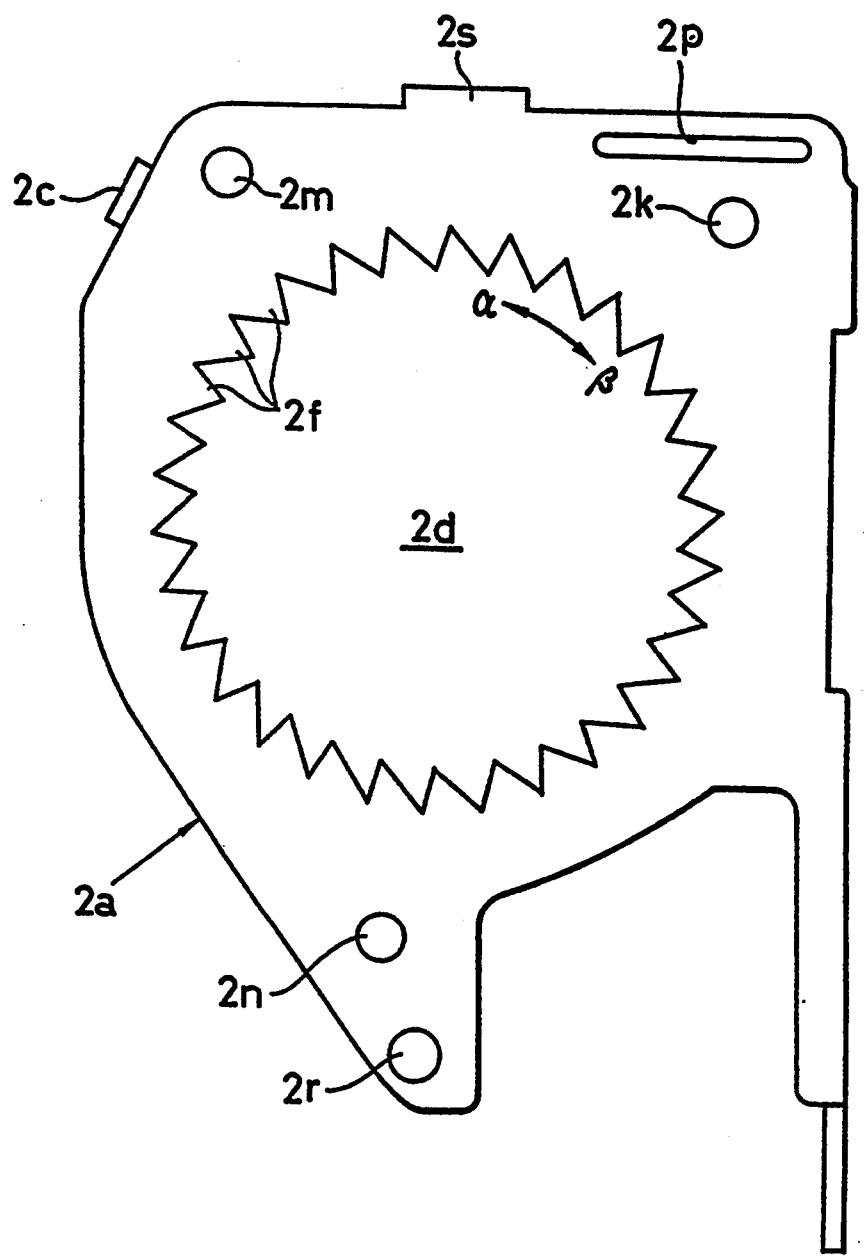
FIG. 5 is a side view of a frame employed in the embodiment, as seen from the right-hand side thereof.
Figure 6:
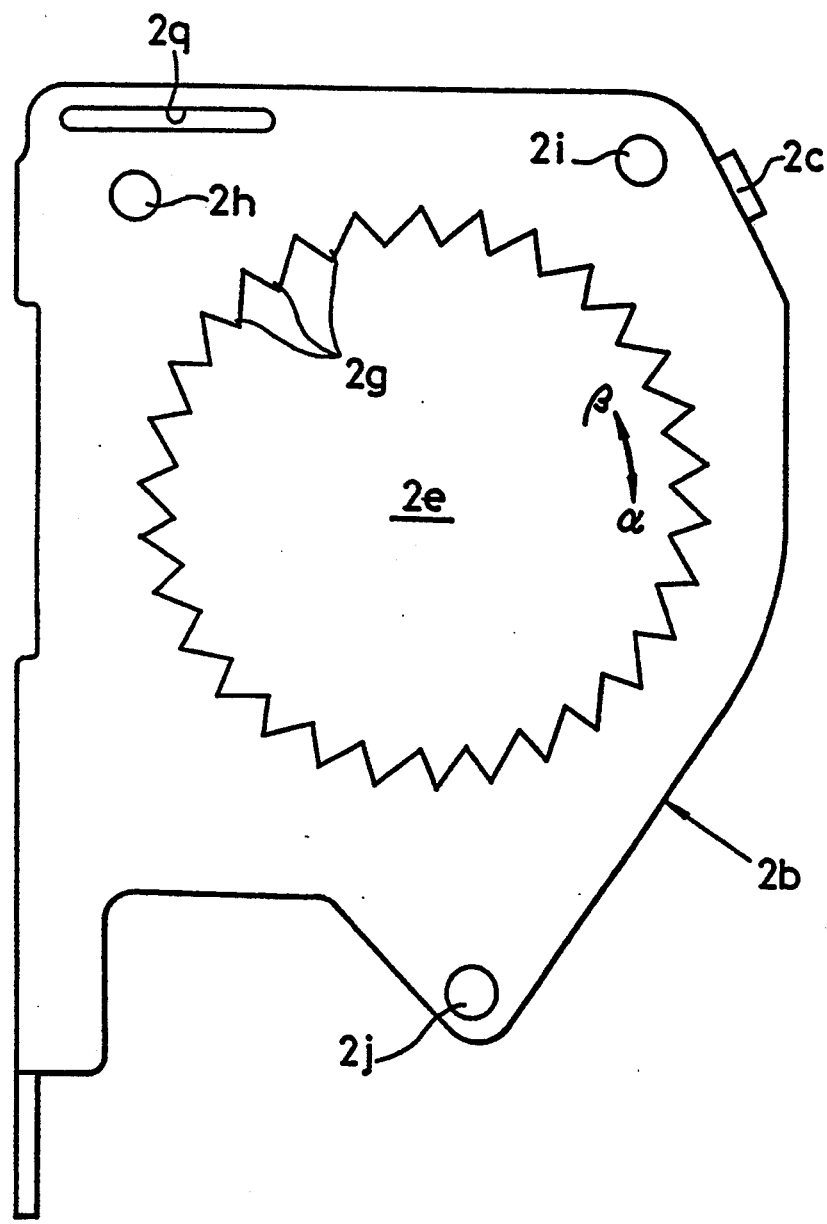
FIG. 6 is a side view of the frame employed in the embodiment, as seen from the left-hand side thereof.

As shown in FIGS. 1A to 4, the seat belt retractor 1 in this embodiment includes a U-shaped frame 2 having a pair of right- and left-hand side walls 2a and 2b, which are connected together through a connecting member 2c, thereby reinforcing the frame 2. The right-hand side wall 2a is formed with a circular hole 2d, as shown in FIG. 5. Similarly, the left-hand side wall 2b is formed with a circular hole 2e, as shown in FIG. 6. In addition, the inner peripheral surface of the hole 2d in the right-hand side wall 2a is formed with a predetermined number of sawtooth-shaped teeth 2f over the entire circumference thereof. Similarly, the inner peripheral surface of the hole 2e in the left-hand side wall 2b is formed with a predetermined number of sawtooth-shaped teeth 2g over the entire circumference thereof. The teeth 2f and 2g have the same triangular cross-sectional configuration. The surface of each tooth that faces a webbing unwinding direction $\alpha$ has a relatively steep slope, whereas the surface of the tooth that faces a webbing winding direction $\beta$ has a relatively gentle slope. The phase of the left-hand teeth $2g$ is advanced a predetermined angle (e.g., 3°) in the webbing unwinding direction $\alpha$ with respect to the phase of the right-hand teeth $2f$.

Further, the left-hand side wall $2b$ is provided with three engagement holes $2h$, $2i$ and $2j$ and a guide hole $2q$ which comprises an elongated hole. The right-hand side wall $2a$ is provided with four engagement holes $2k$, $2m$, $2n$ and $2r$ and a guide hole $2p$ which comprises an elongated hole. In addition, the right-hand side wall $2a$ has an engagement projection $2s$ projecting upwardly from the upper end thereof.

Figure 7:
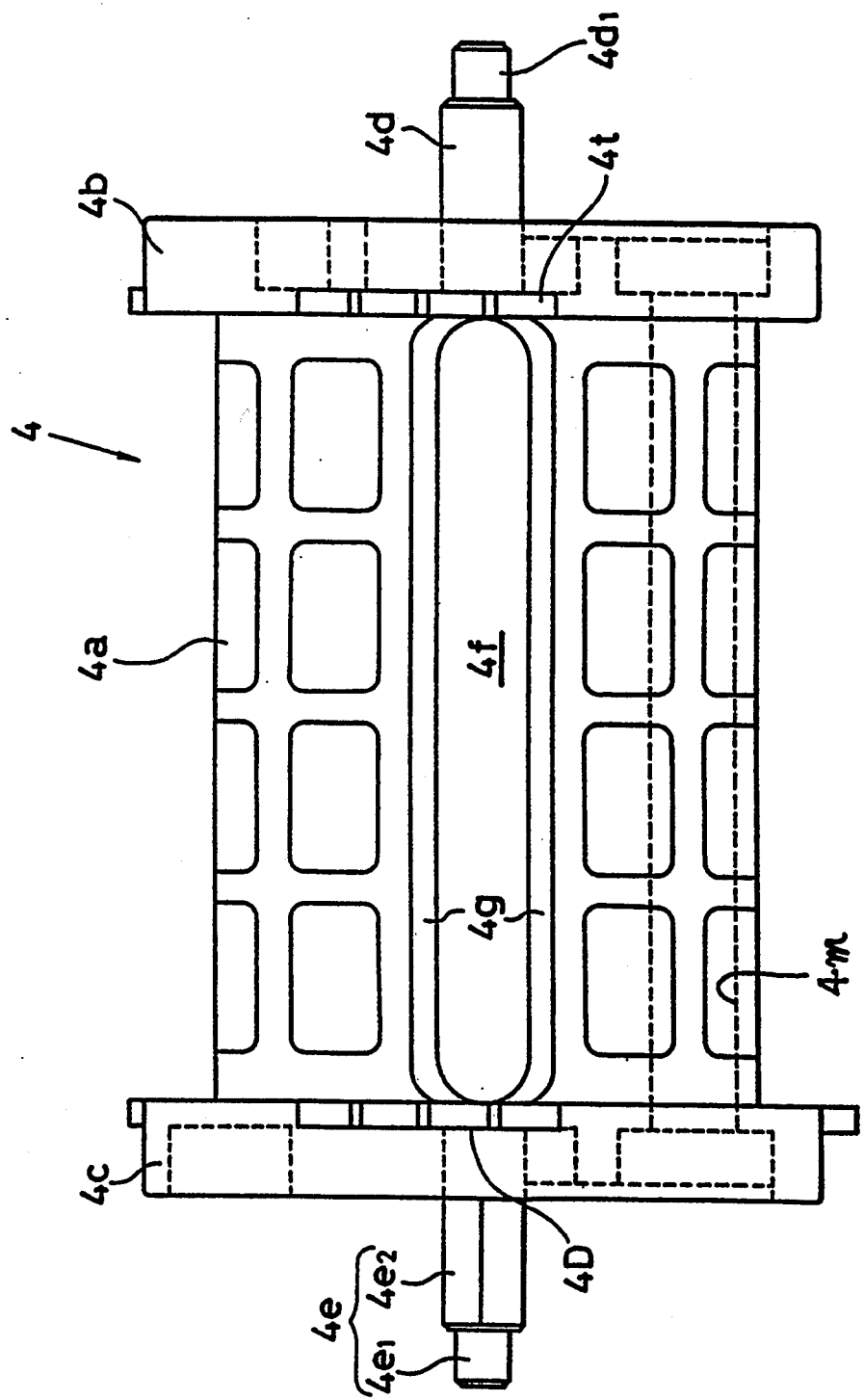
FIG. 7 is a front view of a reel shaft employed in the embodiment.

As shown in FIG. 3, a reel shaft 4 for winding up a webbing 3 is disposed between the right- and left-hand side walls $2a$ and $2b$ of the frame 2. Referring to FIG. 7, the reel shaft 4 comprises a central webbing winding portion $4a$, circular flanges $4b$ and $4c$, which are formed at the right and left ends, respectively, of the webbing winding portion $4a$ so as to guide the webbing 3 when wound up, a first rotating shaft $4d$ that is provided in the center of the flange $4b$ so as to project axially outward, and a second rotating shaft $4e$ that is provided in the center of the flange $4c$ in coaxial relation to the first rotating shaft $4d$. The webbing winding portion $4a$ is provided with a diametrical through-hole $4f$ into which one end of the webbing 3 is inserted and retained so that the webbing 3 can be wound up. One end of the through-hole $4f$ is formed with a relatively wide width. Accordingly, the through-hole $4f$ is designed in the form of a stepped-hole, which has steps $4g$, so that the end of the webbing 3 is retained by the steps $4g$.

As shown in FIG. 8, the right-hand flange $4b$ is provided with a first recess $4h$ for accommodating a pawl spring 18 (shown in FIG. 1A), a second recess $4i$ in which is disposed a pawl portion $17c$ of a main pawl 17 (shown specifically in FIG. 18, described later), a load bearing portion $4k$ that is formed with a load bearing surface $4j$ for receiving a load applied to the pawl portion $17c$ of the main pawl 17, an axial through-hole $4m$ in which a joint pin 19 is rotatably fitted, and a third circular recess $4n$ that is formed at one end of the through-hole $4m$ in concentrical relation to it. Accordingly, a step $4q$ is formed between the second recess $4i$ and a portion of the outer peripheral edge $4p$ of the flange $4b$ where the first recess $4h$ is formed. Similarly, steps $4r$ and $4s$ are respectively formed between the outer peripheral edge $4p$ of the flange $4b$ and the load bearing portion $4k$, and between the second recess $4i$ and the load bearing portion $4k$. The load bearing surface $4j$ is formed from a circular arc of a predetermined length which is a part of a circle concentrical with respect to the through-hole $4m$.

Further, the outer peripheral surface of the flange $4b$ is formed with three circumferentially equally spaced right-hand guide portions $4t$ for axially guiding the reel shaft 4 relative to the right-hand side wall $2a$ when the reel shaft 4 is disposed in between the right- and left-hand side walls $2a$ and $2b$. The size of the right-hand guide portions $4t$ is so set that the flange $4b$ cannot readily pass through the holes $2d$ and $2e$ in the right- and left-hand side walls $2a$ and $2b$. However, the right-hand guide portions $4t$ each have a predetermined number of teeth $4t_1$. The teeth $4t_1$ are similar to but a little smaller than the teeth $2f$ and $2g$ formed on the right- and left-hand side walls $2a$ and $2b$. Accordingly, when the teeth $4t_1$ are matched with the teeth $2f$ or $2g$, the flange $4b$ having the right-hand guide portions $4t$ can pass through the holes $2d$ and $2e$.

Further, the distal end of the first rotating shaft $4d$ is defined as a small-diameter portion $4d_1$, which is rotatably fitted to and supported by a small hole $13n$ provided in a lock gear first cover 13, as described later.

In addition, as shown in FIG. 9, the left-hand flange $4c$ is provided with a fourth recess $4u$ in which is disposed a pawl portion $20c$ of a backup pawl 20 (shown specifically in FIG. 20, described later), a load bearing portion $4w$ that is formed with a load bearing surface $4v$ for receiving a load applied to the pawl portion $20c$ of the backup pawl 20, an axial through-hole $4m$ in which the joint pin 19 is rotatably fitted, and a fifth circular recess $4x$ that is formed at one end of the through-hole $4m$ in concentrical relation to it. Accordingly, a step $4z$ is formed between the fourth recess $4u$ and the outer peripheral edge $4y$ of the flange $4c$. Similarly, steps 4A and 4B are respectively formed between the outer peripheral edge $4y$ of the flange $4c$ and the load bearing portion $4w$, and between the fourth recess $4u$ and the load bearing portion $4w$. The load bearing surface $4v$ is formed from a circular arc of a predetermined length which is a part of a circle concentrical with respect to the through-hole $4m$.

The outer peripheral surface of the flange $4c$ is also formed with three circumferentially equally spaced left-hand guide portions 4D for axially guiding the reel shaft 4 relative to the left-hand side wall $2b$ when the reel shaft 4 is disposed in between the right- and left-hand side walls $2a$ and $2b$. The size of the left-hand guide portions 4D is so set that the flange $4c$ cannot readily pass through the holes $2d$ and $2e$ in the right- and left-hand side walls $2a$ and $2b$. However, the left-hand guide portions 4D each have a predetermined number of teeth $4D_1$. The teeth $4D_1$ are similar to but a little smaller than the teeth $2f$ and $2g$ formed on the right- and left-hand side walls $2a$ and $2b$. Accordingly, when the teeth $4D_1$ are matched with the teeth $2f$ or $2g$, the flange $4c$ having the left-hand guide portions 4D can pass through the holes $2d$ and $2e$.

Further, the second rotating shaft $4e$, which projects axially from the flange $4c$, has a distal end portion $4e_1$ with a circular cross-sectional configuration. The root portion $4e_2$ of the second rotating shaft $4e$ has a polygonal (square in this embodiment) cross-sectional configuration.

As will be clear from FIG. 7, the through-hole $4m$ extends not only through the flanges $4b$ and $4c$ but also through the central webbing winding portion $4a$ axially. In other words, the through-hole $4m$ extends axially through the reel shaft 4.

As shown in FIGS. 1B and 3, the left-hand side wall $2b$ has a biasing force application means 5 attached thereto for giving the reel shaft 4 force for winding up the webbing 3. Further, a seat belt lock activating means 6 is attached to the right-hand side wall $2a$, as shown in FIGS. 1A, 1C and 3. In addition, the right-hand side wall $2a$ is provided with a deceleration sensing means 7, as shown in FIGS. 1C and 3. When a predetermined degree of deceleration acts on the vehicle, the deceleration sensing means 7 senses the deceleration and activates the seat belt lock activating means 6.

The biasing force application means 5 comprises a power spring 8, which is a spiral spring, a bush 9 to which the inner end $8a$ of the power spring 8 is connected to apply spring force thereto, a spring casing 10 to which the outer end 8b of the power spring 8 is secured and which accommodates the power spring 8, and a cover 11 which is attached to the spring casing 10 to cover the power spring 8.

Figure 10:
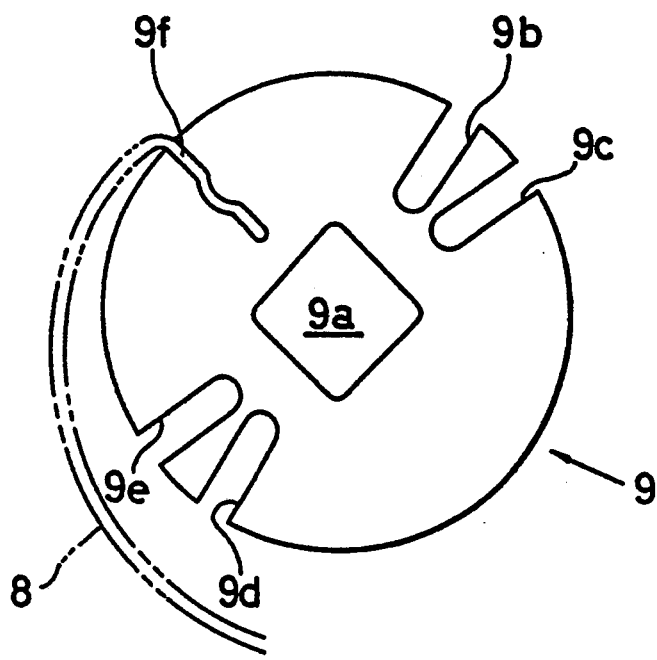
FIG. 10 is a side view of a bush employed in the embodiment, as seen from the left-hand side thereof.

As shown in FIG. 10, the center of the bush 9 is provided with an axially extending through-hole 9a which can be fitted with the root portion $4e_2$ of the second rotating shaft 4e of the reel shaft 4. The through-hole 9a has the same polygonal cross-sectional configuration as that of the root portion $4e_2$ of the second rotating shaft 4e. The bush 9 is further provided with four grooves 9b, 9c, 9d and 9e of U-shaped cross-section which open in the outer peripheral surface thereof. Among these grooves, the grooves 9b and 9d are disposed diametrically opposite to each other with respect to the center of the bush 9, and so are the grooves 9c and 9e. These grooves are pierced with a spring pin 12 (shown in FIG. 1B), as described later. The bush 9 is further provided with a retaining groove 9f in which the inner end 8a of the spring 8 is fitted and retained.

The bush 9 is connected to the second rotating shaft 4e so as to be unable to rotate relative to it by fitting the hole 9a with the root portion $4e_2$ of the second rotating shaft 4e, thereby allowing the spring force of the spring 8 to act on the reel shaft 4 through the bush 9 in the webbing winding direction $\beta$ at all times.

Figure 11A:
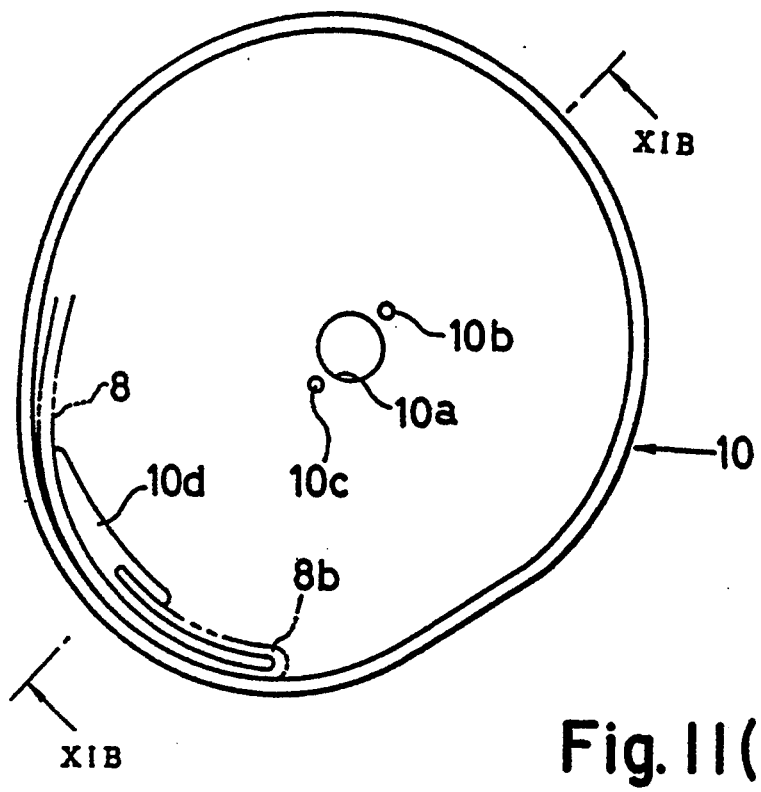
FIG. 11(a) is a side view of the spring casing as seen from the right-hand side thereof.
Figure 11B:
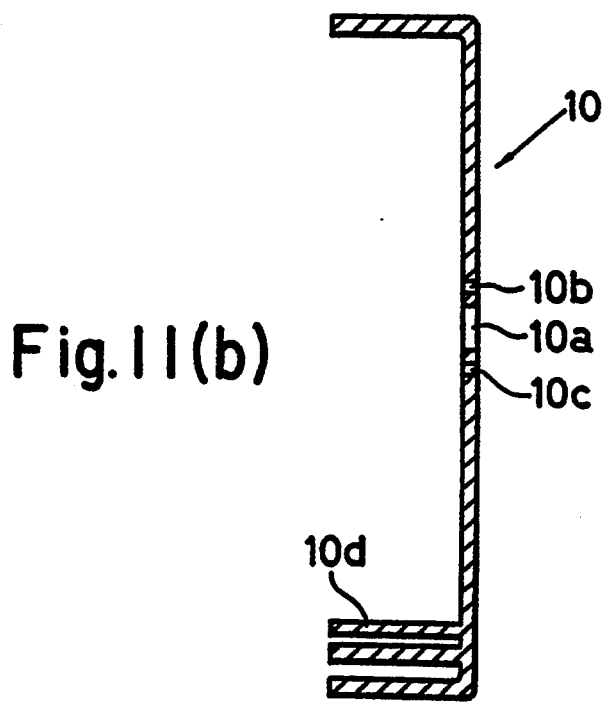
FIG. 11(b) is a sectional view taken along the line XIB—XIB in FIG. 11(a).

As shown in FIG. 11, the spring casing 10 has a hole 10a provided in an approximately central portion thereof for rotatably fitting the root portion $4e_2$ of the second rotating shaft 4e of the reel shaft 4. The spring casing 10 further has a pair of small holes 10b and 10c which are provided at respective positions which face each other across the hole 10a. The small holes 10b and 10c are pierced with the spring pin 12. In addition, a retaining portion 10d which retains the outer end 8b of the spring 8 is provided near the outer peripheral edge of the spring casing 10.

Figures 12A, 12B:
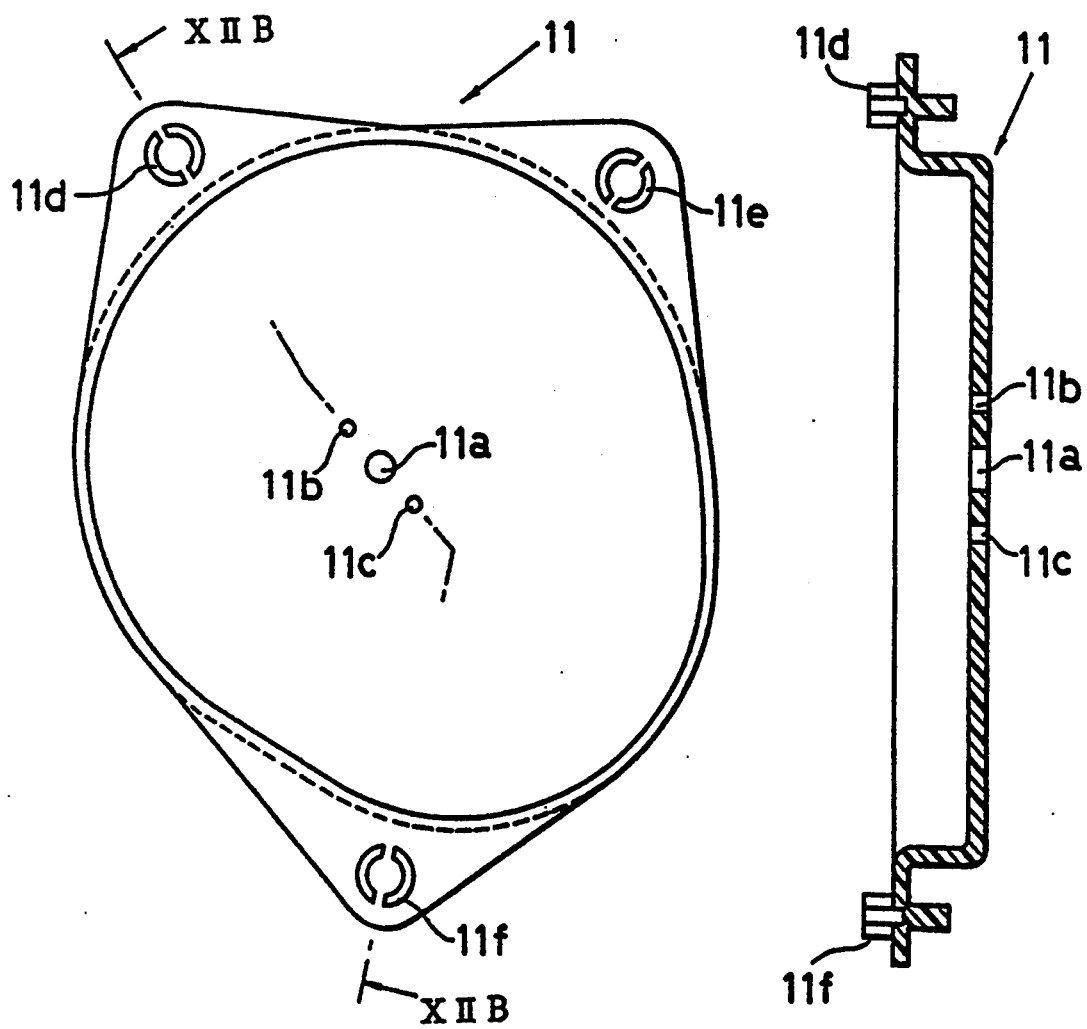
FIG. 12(a) is a side view of the cover as seen from the left-hand side thereof.
FIG. 12(b) is a sectional view taken along the line XIIB—XIIB in FIG. 12(a).

As shown in FIG. 12, the cover 11 has a hole 11a provided in an approximately central portion thereof for rotatably supporting the distal end portion $4e_1$ of the second rotating shaft 4e of the reel shaft 4. The cover 11 further has a pair of small holes 11b and 11c which are provided at respective positions which face each other across the hole 11a. The small holes 11b and 11c are pierced with the spring pin 12. In addition, three engagement projections 11d, 11e and 11f are provided on a flange formed at one end of the cover 11. These projections 11d, 11e and 11f are fitted into and engaged with the corresponding engagement holes 2h, 2i and 2j, which are provided in the left-hand side wall 2b of the frame 2, thereby allowing the biasing force application means 5 to be removably attached to the left-hand side wall 2b of the frame 2.

Incidentally, when the seat belt retractor is to be assembled, the biasing force application means 5 is assembled in advance as a subassembly, and this subassembly is attached to the left-hand side wall 2b of the frame 2. When the biasing force application means 5 is in the subassembled state, the power spring 8 needs to be held in a state where it has been wound up by a predetermined amount in the webbing unwinding direction $\alpha$ in order to apply spring force to the reel shaft 4 in the webbing winding direction $\beta$ at all times. For this purpose, the spring pin 12 as shown in FIG. 1B is employed.

Figure 13:
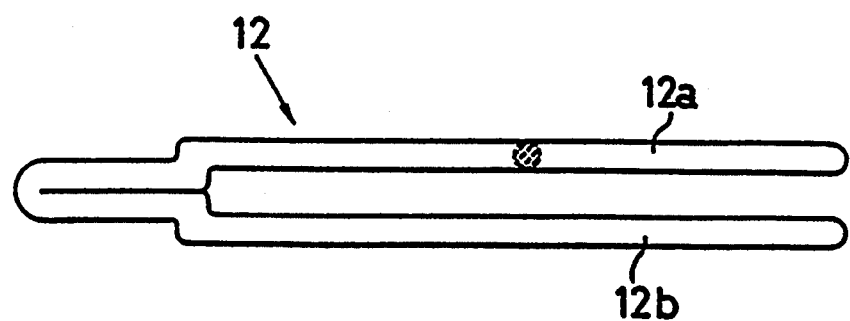
FIG. 13 shows a spring pin employed in the embodiment.

As shown in FIG. 13 in detail, the spring pin 12 is formed by bending an elastic wire material 12 so as to have two rotation preventing arms 12a and 12b. In order to prevent the power spring 8 from unwinding when the biasing force application means 5 is in the subassembled state, the spring pin 12 is attached so that the rotation preventing arms 12a and 12b pierce through the small holes 11b and 11c of the spring cover 11, either of the grooves 9b and 9c and either of the grooves 9d and 9e, which are provided in the bush 9, and the small holes 10b and 10c of the spring casing 10, as shown in FIG. 1B, thereby preventing undesired unwinding of the power spring 8.

In the meantime, the seat belt lock activating means 6 comprises a lock gear first cover 13 which is secured to the right-hand side wall 2a of the frame 2, a lock gear 14, an inertia member 15 which is rockably attached to the lock gear 14, a control spring 16 which is disposed between the lock gear 14 and the inertia member 15, and a lock gear second cover 21 which is fitted to and supported by the right-hand side wall 2a of the frame 2 so as to cover the lock gear first cover 13, the lock gear 14, the inertia member 15, the main pawl 17 (described later), the joint pin 19, the backup pawl 20 (described later), and the deceleration sensing means 7.

The main pawl 17 has one end thereof pivotably supported in the third recess 4n, which is formed in the flange 4b of the reel shaft 4. The other end of the main pawl 17 forms an engagement portion that is disposed in the second recess 4i. The pawl spring 18 is compressedly loaded in between the reel shaft 4 and the main pawl 17. The pawl spring 18 is accommodated in the first recess 4h of the reel shaft 4. Further, the joint pin 19 is provided so as to extend through the axial hole 4m of the reel shaft 4, and the backup pawl 20 is connected to one end of the joint pin 19. One end of the backup pawl 20 is pivotally supported in the fifth recess 4x, which is formed in the flange 4c of the reel shaft 4. The other end of the backup pawl 20 forms an engagement portion that is disposed in the fourth recess 4u.

Further, the seat belt retractor 1 has a webbing guide 22 (shown in detail in FIG. 25) for guiding the webbing 3.

Figure 14:
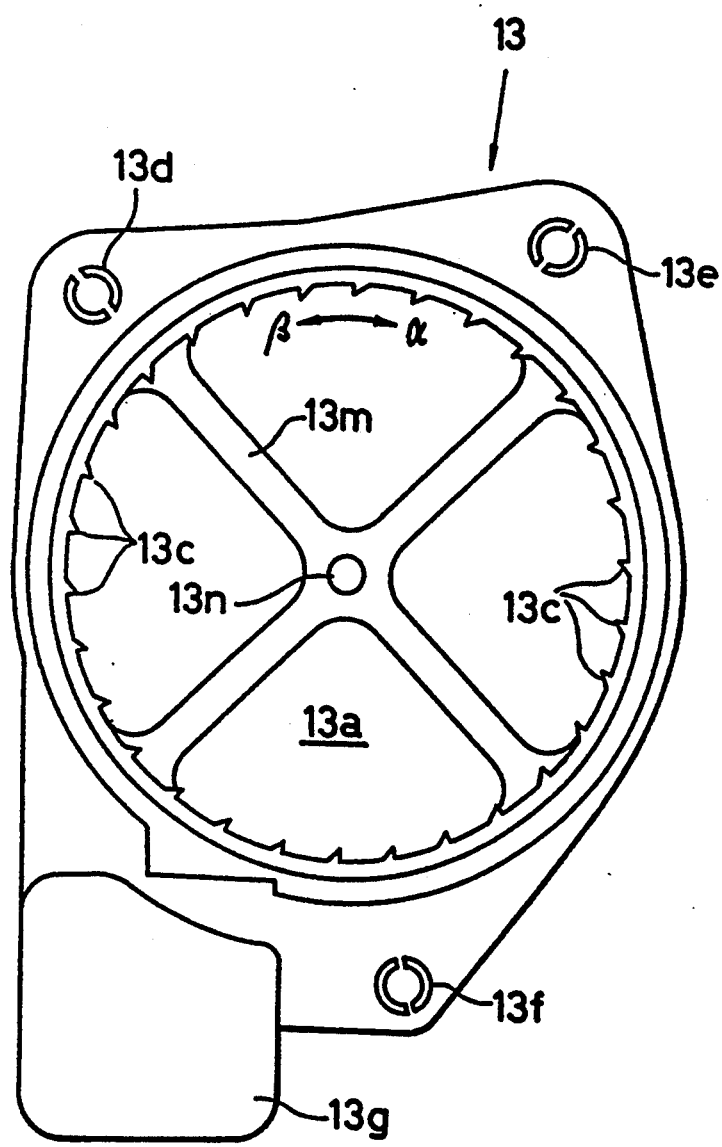
FIG. 14 is a side view of a lock gear first cover employed in the embodiment, as seen from the left-hand side thereof.
Figure 15:
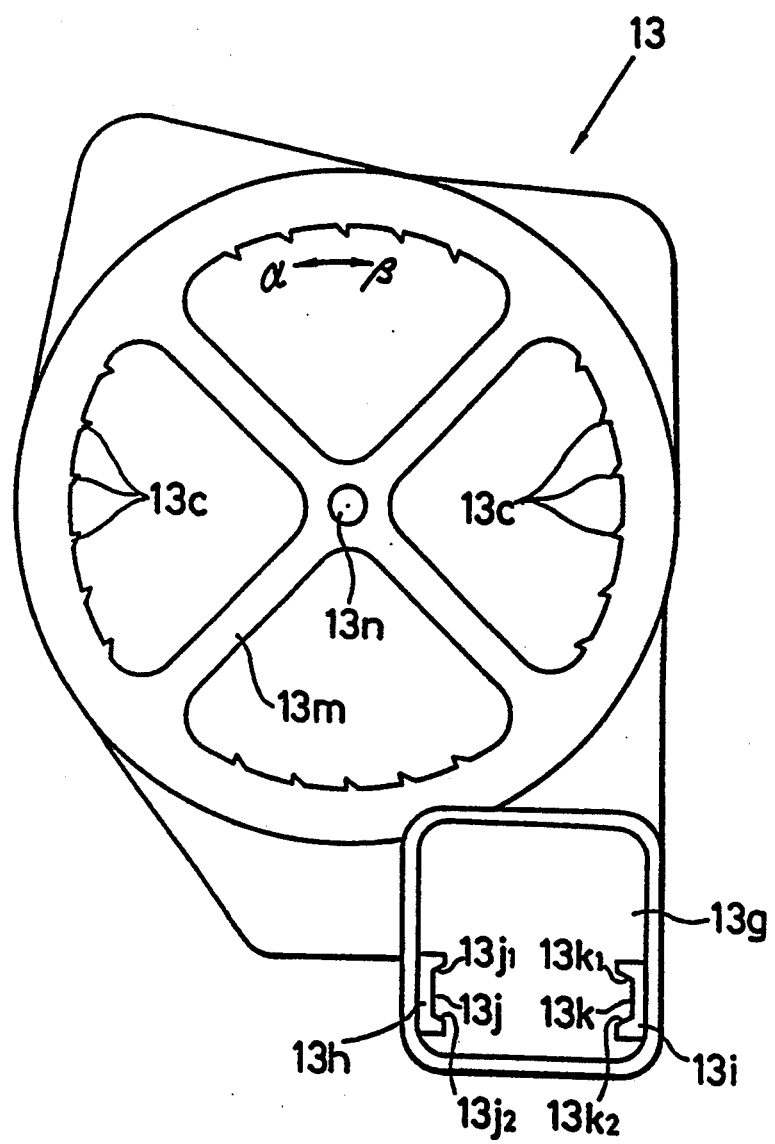
FIG. 15 is a side view of the lock gear first cover employed in the embodiment, as seen from the right-hand side thereof.

As shown in FIGS. 14 and 15, the lock gear first cover 13 has a relatively large through-hole 13a. The inner peripheral surface of the through-hole 13a is formed with a predetermined number of teeth 13c over the entire circumference thereof. The annularly disposed teeth 13c have a triangular cross-sectional configuration in which the surface of each tooth 13c which faces the webbing unwinding direction $\alpha$ is a substantially vertical surface, whereas, the surface thereof which faces the webbing winding direction $\beta$ is a relatively gentle slope. Further, the lock gear first cover 13 has three engagement projections 13d, 13e and 13f provided on a side thereof which faces the right-hand side wall 2a of the frame 2, as shown in FIG. 14. These engagement projections 13d, 13e and 13f are fitted into the engagement holes 2k, 2m and 2n, respectively, which are formed in the right-hand side wall 2a, thereby allowing the lock gear first cover 13 to be removably attached to the frame 2.

As shown in FIG. 15, the lock gear first cover 13 is provided with a portion 13g for accommodating the deceleration sensing means 7, which opens to the side reverse to the side where the engagement projections 13d, 13e and 13f are provided. The inner wall of the accommodating portion 13g is provided with a pair of guide members 13h and 13i that guide the deceleration sensing means 7 in a direction perpendicular to the plane of FIG. 15 and that fixedly support the deceleration sensing means 7. The mutually opposing surfaces of the guide members 13h and 13i are formed with respective recesses 13j and 13k of trapezoidal cross-section which extend longitudinally of the guide members 13h and 13i. In other words, the side walls $13j_1$, $13j_2$, $13k_1$ and $13k_2$ of the recesses 13j and 13k have slant surfaces.

In addition, an approximately cross-shaped side wall 13m is formed on the lock gear first cover 13 on the side thereof which is reverse to the side where the engagement projections 13d, 13e and 13f are provided. The side wall 13m is so designed that the intersection of two crossing portions of the side wall 13m is substantially coincident with the center of the circle that is defined by the annularly disposed teeth 13c. The intersection of the side wall 13m is provided with a small hole 13n at a position which is coincident with the center of the annularly disposed teeth 13c. The small hole 13n is fitted with the small-diameter end portion $4d_1$ of the first rotating shaft 4d of the reel shaft 4 rotatably with substantially no gap left therebetween, thereby allowing the first rotating shaft 4d to be rotatably supported by the small hole 13n.

As shown in FIG. 16(a), the lock gear 14 comprises a circular flat plate portion 14a, and an annular flange 14b that is formed around the outer peripheral edge of the flat plate portion 14a. The outer peripheral surface of the flange 14b is formed with a predetermined number of teeth 14c. The teeth 14c each have a triangular cross-sectional configuration in which the surface of each tooth 14c which faces the webbing unwinding direction α is a relatively gentle slope, whereas, the surface thereof which faces the webbing winding direction β is a substantially vertical surface.

As shown in FIGS. 16(a) and 16(b), the flat plate portion 14a has a spring retaining member 14d provided on the left-hand side thereof (as viewed in FIG. 16(b); the side that is surrounded with the flange 14b) for supporting one end of the control spring 16. The spring retaining member 14d is provided with a spring guide portion 14e that projects parallel to the flat plate portion 14a. Further, the flat plate portion 14a is provided with a shaft 14f for rockably supporting the inertia member 15, as described later. An arcuate fall preventing member 14g is provided adjacent to the shaft 14f.

As shown in FIG. 16(c), the fall preventing member 14g has a retaining projection $14g_1$ formed on the distal end thereof. The retaining projection $14g_1$ has a slant surface at the upper end thereof and projects a little toward the shaft 14f. Accordingly, when fitted onto the shaft 14f, the inertia member 15 presses the slant surface of the retaining projection $14g_1$, so that the fall preventing member 14g is elastically deformed so as to enlarge a little the gap between the shaft 14f and the fall preventing member 14g. Thus, the inertia member 15 rides over the retaining projection $14g_1$ and is accommodated in the space defined between the shaft 14f and the fall preventing member 14g. In this state, if the inertia member 15 is urged to move axially upward as viewed in FIG. 16(c), the axial movement is prevented by the retaining projection $14g_1$. Thus, the inertia member 15 is prevented from coming off the shaft 14f. However, since the amount to which the retaining projection $14g_1$ projects is so small that the inertia member 15 and the retaining projection $14g_1$ engage each other lightly, the inertia member 15 can readily ride over the retaining projection $14g_1$ and come off the shaft 14f when a relatively small external force is applied to the inertia member 15 in a direction in which it comes off the shaft 14f. The fall preventing member 14g allows the inertia member 15 to be readily attached to and removed from the shaft 14f and also enables the inertia member 15 to be reliably supported by the shaft 14 in a rockable state.

In addition, the flat plate portion 14a is provided with a first stopper 14h and a second stopper 14i and further has a tubular rotating shaft 14j axially projecting from the center of the flat plate portion 14a. It should be noted that the bore of the tubular rotating shaft 14j is pierced with the first rotating shaft 4d of the reel shaft 4 so that the rotating shaft 14j is rotatable about the first rotating shaft 4d.

Further, the flat plate portion 14a is provided with first, second and third cam holes 14k, 14m and 14n, which extend through the flat plate portion 14a and have predetermined configurations. As shown in FIG. 16(b), the respective peripheral edges of the first, second and third cam holes 14k, 14m and 14n are made greater than the flat plate portion 14a in the wall thickness so that cam followers which are fitted in these cam holes are guided effectively and reliably and the peripheral edges of the cam holes are reinforced. The first cam hole 14k is formed as a circular arc centered at the rotating shaft 14j.

On the right-hand side (as viewed in FIG. 16(b); the side that is not surrounded with the flange 14b) of the flat plate portion 14a is provided with a spring retaining member 14p for supporting one end of the pawl spring 18. The spring retaining member 14p is provided with a spring guide portion 14q which projects parallel to the flat plate portion 14a.

As shown in FIG. 17, the inertia member 15 is formed in an approximately C shape from a flat plate. The inertia member 15 is formed in the center thereof with a boss portion 15b having a hole 15a. Further, a pawl 15c is formed at one end of the inertia member 15. The other end of the inertia member 15 is provided with a spring retaining portion 15d and a spring guide portion 15e for supporting and guiding the other end of the control spring 16. As shown in FIG. 2, the inertia member 15 is rockably supported on the lock gear 14 by fitting the hole 15a with the shaft 14f of the lock gear 14. At this time, the boss portion 15b of the inertia member 15 is retained by the retaining projection $14g_1$ of the fall preventing member 14g, thereby preventing the inertia member 15 from coming off the shaft 14f, as described above.

As shown in FIG. 2, the control spring 16 is fitted at both ends thereof to the respective guide portions 14e and 15e of the lock gear 14 and the inertia member 15 in a state where the inertia member 15 is rockably supported on the shaft 14f. Thus, the control spring 16 is compressedly loaded between the spring retaining members 14d and 15d. Accordingly, the inertia member 15 is constantly biased in the direction α relative to the lock gear 14 by the spring force from the control spring 16, so that it is normally held in a position where it abuts on the first stopper 14h, as shown by the solid line. On the other hand, when the inertia member 15 rotates in the direction β relative to the lock gear 14 against the spring force from the control spring 16, the inertia member 15 assumes a position where it abuts on the second stopper 14i, as shown by the two-dot chain line.

As shown in FIGS. 2 and 3, when the seat belt retractor 1 is in an assembled state, the teeth 13c of the lock gear first cover 13 lie inside the annular flange 14b of the lock gear 14 and in between the flange 14b and the inertia member 15. Since the inertia member 15 is normally held in a position where it abuts on the first stopper 14h, which is shown by the solid line in FIG. 2, the pawl 15c is held in a non-engaging position, which is apart from the teeth 13c. When the inertia member 15 is in a position where it abuts on the second stopper 14i, which is shown by the two-dot chain line in FIG. 2, the pawl 15c assumes a position where it is engageable with a tooth 13c.

If the lock gear 14 rotates in the webbing unwinding direction α when the pawl 15c is in the engageable position, the pawl 15c engages with a tooth 13c, so that the lock gear 14 is prevented from further rotating in the webbing unwinding direction α. If the lock gear 14 rotates in the webbing winding direction β when the pawl 15c is in the engageable position, the pawl 15c passes over the teeth 13c while moving along the gentle slopes of the teeth 13c against the control spring 16. Accordingly, the lock gear 14 is rotatable in the webbing winding directions.

Figure 8A:
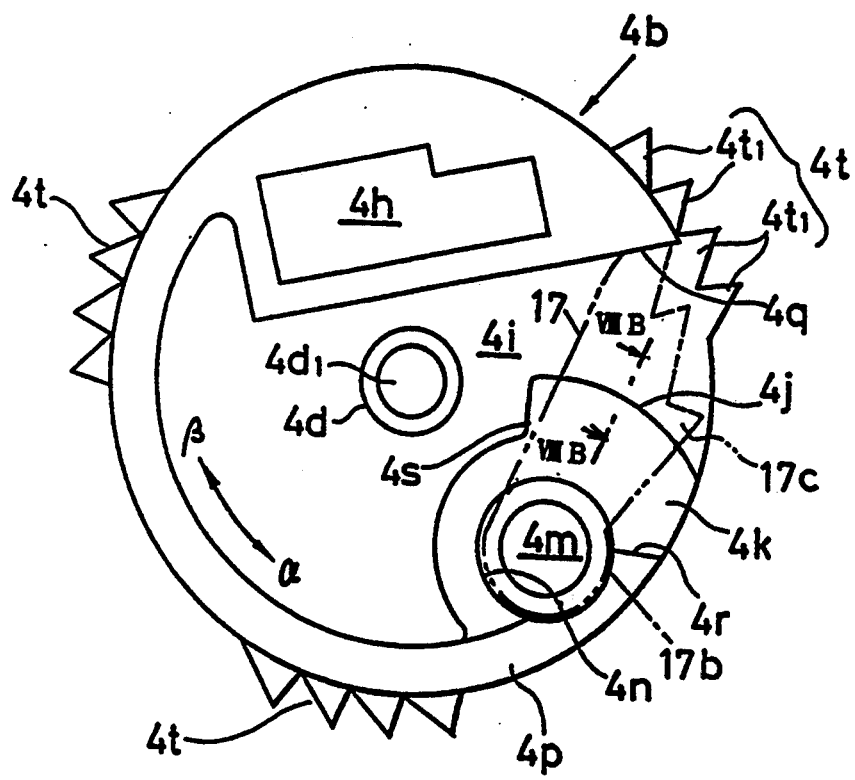
FIG. 8(a) is a side view of the reel shaft as seen from the right-hand side thereof.

As shown in FIG. 18, the main pawl 17 is formed in a substantially fan-like shape and has a boss portion 17b formed in a portion thereof which acts as a pivot. The boss portion 17b has a through-hole 17a. The main pawl 17 has a pawl portion 17c formed at an end thereof which is remote from the pivot. Further, teeth 17d which are engageable with the teeth 2f of the right-hand side wall 2a of the frame 2 are formed at the distal end of the pawl portion 17c. As shown in FIG. 8(a), the boss portion 17b is pivotably fitted in the third recess 4n of the flange 4b of the reel shaft 4. Accordingly, the main pawl 17 is attached to the reel shaft 4 so as to be pivotable about the boss portion 17b. When it abuts on the step 4q formed on the flange 4b, the main pawl 17 is prevented from further pivoting in the direction α, whereas, when it abuts on the step 4r formed on the flange 4b, the main pawl 17 is prevented from further pivoting in the direction β. In other words, these steps 4q and 4r serve as stoppers for limiting the pivoting motion of the main pawl 17 in the directions α and β, respectively.

When the main pawl 17 abuts on the step 4q, the teeth 17d formed at the distal end thereof lie completely inside the outer peripheral surface of the flange 4b. When the main pawl 17 abuts on the step 4r, the teeth 17d project outwardly from the outer peripheral surface of the flange 4b to reach a position where the teeth 17d are engageable with the teeth 2f of the right-hand side wall 2a of the frame 2, as described later. In addition, the main pawl 17 has a load transfer portion 17e formed at an end of the pawl portion 17c which is remote from the teeth 17d. The load transfer portion 17e is formed from a circular arc which is a part of a circle concentrical with respect to the through-hole 17a and the boss portion 17b.

As shown by the two-dot chain line in FIG. 8(a), the main pawl 17 is attached to the right-hand flange 4b by rotatably fitting the boss portion 17b into the third recess 4n of the reel shaft 4. When the main pawl 17 is attached to the right-hand flange 4b, the pawl portion 17c lies in the second recess 4i, while the load transfer portion 17e abuts on the load bearing surface 4j of the reel shaft 4. Since the load transfer portion 17e and the load bearing surface 4j of the reel shaft 4 are formed from circular arcs of the same circle, the load transfer portion 17e abuts on the load bearing surface 4j of the reel shaft 4 at all times irrespective of the position of the main pawl 17.

Figure 8B:
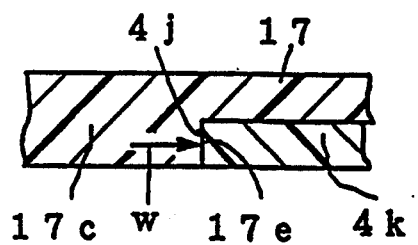
FIG. 8(b) is a sectional view taken along the line VIIIB—VIIIB in FIG. 8(a).

Thus, since the load transfer portion 17e abuts on the load bearing surface 4j of the reel shaft 4, a load w applied to the pawl portion 17c of the main pawl 17 is transferred from the load transfer portion 17e to the load bearing surface 4j, as shown in FIG. 8(b), and borne by the reel shaft 4. In such a load bearing structure, since the teeth 17d, which serve as a point of application of load, and the load transfer portion 17e are relatively close to each other, substantially no flexure acts on the main pawl 17, but compression alone acts thereon substantially. Moreover, since the load transfer portion 17e and the load bearing surface 4j are in plane contact with each other, the load is transferred to the reel shaft 4 through a relatively wide area and hence dispersed, so that the stress produced therein is relatively small. Accordingly, the level of strength required for the main pawl 17 is lower than that of the conventional main pawl, and hence the main pawl 17 can be formed by using a relatively lightweight material, e.g., a resin material.

Further, the main pawl 17 has a columnar cam follower 17f projecting from a side thereof which is reverse to the side where the load transfer portion 17e is provided. The cam follower 17f is fitted into the third cam hole 14n of the lock gear 14 so as to be guided along the cam hole 14n.

The pawl spring 18 is accommodated in the first recess 4h of the reel shaft 4 and fitted to the spring guide portion 14q of the lock gear 14 so as to be compressedly loaded between the wall surface of the first recess 4h and the spring retaining portion 14p. Accordingly, the pawl spring 18 constantly biases the main pawl 17 relative to the reel shaft 4 in the webbing unwinding direction α. Therefore, the main pawl 17 is normally held in abutment on the step 4q, which is formed on the flange 4b, by the biasing force of the pawl spring 18.

As shown in FIG. 19, the joint pin 19 has a body 19a that is formed with a circular cross-sectional configuration. The body 19a is formed at the right-hand end thereof (as viewed in FIG. 19(a)) with an arm 19b that extends at right angles to the body 19a. A cam follower 19c having a circular cross-sectional configuration is provided at the distal end of the arm 19b. The cam follower 19c is fitted into the second cam hole 14m of the lock gear 14 so as to be guided along the cam hole 14m. A shaft portion 19d having a rectangular cross-sectional configuration is formed at the other end of the body 19a. The shaft portion 19d is fitted into a hole formed in one end portion of the backup pawl 20 (described later) so as to be unable to rotate relative to the backup pawl 20. Accordingly, when the arm 19b pivots in response to the movement of the cam follower 19c guided along the second cam hole 14m, the body 19a rotates, and the rotation of the body 19a is transferred to the backup pawl 20. Thus, the backup pawl 20 pivots in response to the movement of the cam follower 19c guided along the second cam hole 14m.

Figure 9A:
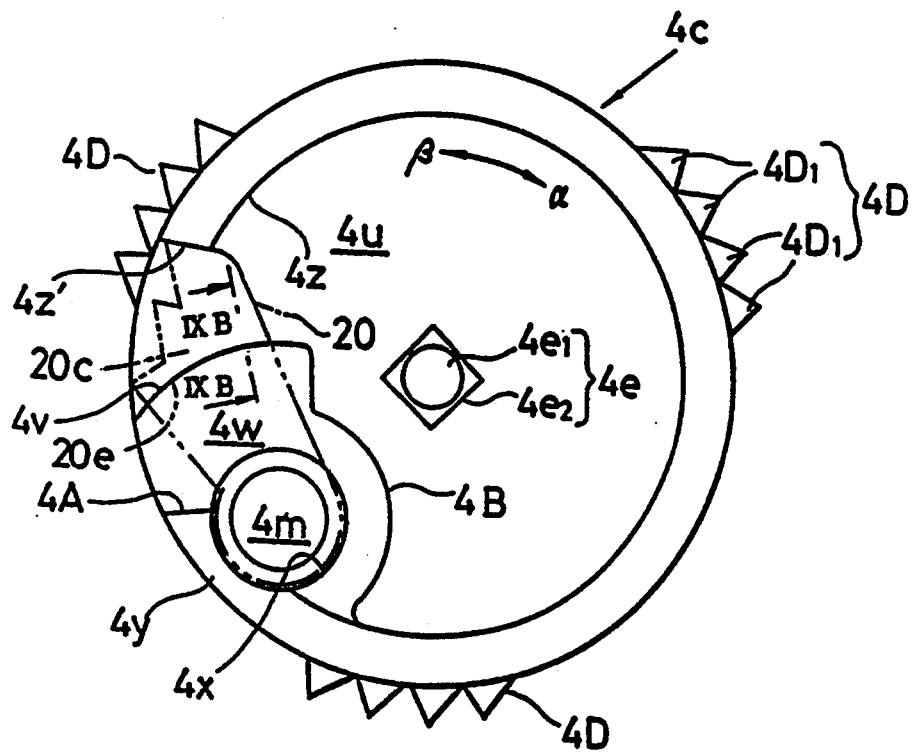
FIG. 9(a) is a side view of the reel shaft as seen from the left-hand side thereof.

As shown in FIG. 20, the backup pawl 20 is formed in a substantially fan-like shape and has a boss portion 20b formed in a portion thereof which serves as a pivot. The boss portion 20b has a through-hole 20a of rectangular cross-section. The backup pawl 20 has a pawl portion 20c formed at an end thereof which is remote from the pivot. Further, teeth 20d which are engageable with the teeth 2g of the left-hand side wall 2b of the frame 2 are formed at the distal end of the pawl portion 20c. As shown in FIG. 9(a), the boss portion 20b is pivotably fitted in the fifth recess 4x of the flange 4c of the reel shaft 4. Accordingly, the backup pawl 20 is attached to the reel shaft 4 so as to be pivotable about the boss portion 20b. When the backup pawl 20 abuts on a portion 4z' of the step 4z, formed on the flange 4c, which is located at an end of the outer peripheral edge 4y, the backup pawl 20 is prevented from further pivoting in the direction α, whereas, when it abuts on the step 4A formed on the flange 4c, the backup pawl 20 is prevented from further pivoting in the direction β. In other words, these steps 4z' and 4A serve as stoppers for limiting the pivoting motion of the backup pawl 20 in the directions α and β, respectively. When the backup pawl 20 abuts on the step 4z' the teeth 20d formed at the distal end thereof lie completely inside the outer peripheral surface of the flange 4c. When the backup pawl 20 abuts on the step 4A, the teeth 20d project outwardly from the outer peripheral surface of the flange 4c to reach a position where the teeth 20d are engageable with the teeth 2g of the left-hand side wall 2b of the frame 2, as described later. In addition, the backup pawl 20 has a load transfer portion 20e formed at an end of the pawl portion 20c which is remote from the teeth 20d. The load transfer portion 20e is formed from a circular arc which is a part of a circle concentrical with respect to the through-hole 20a and the boss portion 20b.

As shown in FIG. 9(a), when the backup pawl 20 is attached to the left-hand flange 4c, the pawl portion 20c lies in the fourth recess 4u, while the load transfer portion 20e abuts on the load bearing surface 4v of the reel shaft 4. In this case, the load transfer portion 20e abuts on the load bearing surface 4v of the reel shaft 4 at all times irrespective of the position of the backup pawl 20.

Figure 9B:
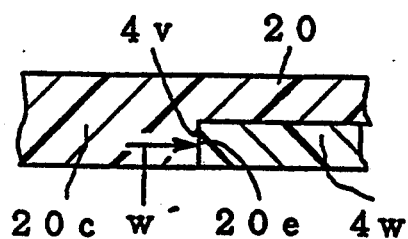
FIG. 9(b) is a sectional view taken along the line IXB—IXB in FIG. 9(a).

Thus, since the load transfer portion 20e abuts on the load bearing surface 4v of the reel shaft 4, a load w' applied to the pawl portion 20c of the backup pawl 20 is transferred from the load transfer portion 20e to the load bearing surface 4v, as shown in FIG. 9(b), and borne by the reel shaft 4. In such a load bearing structure, since the teeth 20d, which serve as a point of application of load, and the load transfer portion 20e are relatively close to each other, substantially no flexure acts on the backup pawl 20, but compression alone acts thereon substantially, in the same way as in the case of the above-described main pawl 17. Moreover, since the load transfer portion 20e and the load bearing surface 4v are in plane contact with each other, the load is transferred to the reel shaft 4 through a relatively wide area and hence dispersed, so that the stress produced therein is relatively small. Accordingly, the level of strength required for the backup pawl 20 is lower than that of the conventional backup pawl, and hence the backup pawl 20 can be formed by using a relatively lightweight material, e.g., a resin material.

Figure 21A:
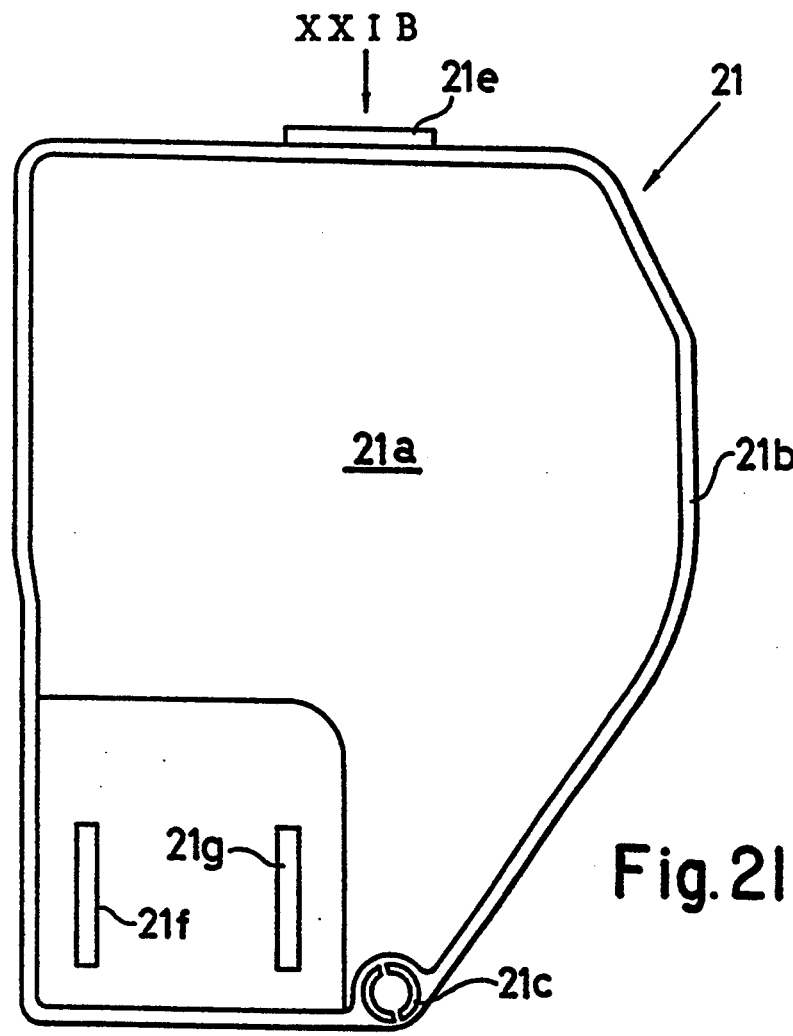
FIG. 21(a) is a side view of the lock gear second cover as seen from the left-hand side thereof.
Figure 21B:
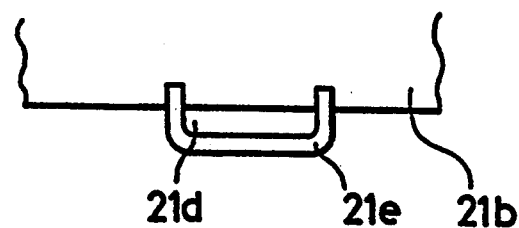
FIG. 21(b) is a view as seen from the direction of the arrow XXIB in FIG. 21(a).

As shown in FIG. 21, the lock gear second cover 21 comprises a flat plate portion 21a, a flange 21b formed around the outer peripheral edge of the flat plate portion 21a, an engagement projection 21c that is fitted into a through-hole formed in the right-hand side wall 2a of the frame 2, and an engagement portion 21e that defines a gap 21d into which is fitted the engagement projection 2s formed on the upper end of the right-hand side wall 2a. By fitting the engagement projection 2s into the gap 21d, the engagement portion 21e is engaged with the engagement projection 2s, and by fitting the engagement projection 21c into the engagement hole 2r of the right-hand side wall 2a, the lock gear second cover 21 is removably attached to the right-hand side wall 2a so as to cover the deceleration sensing means 7.

Figure 22:
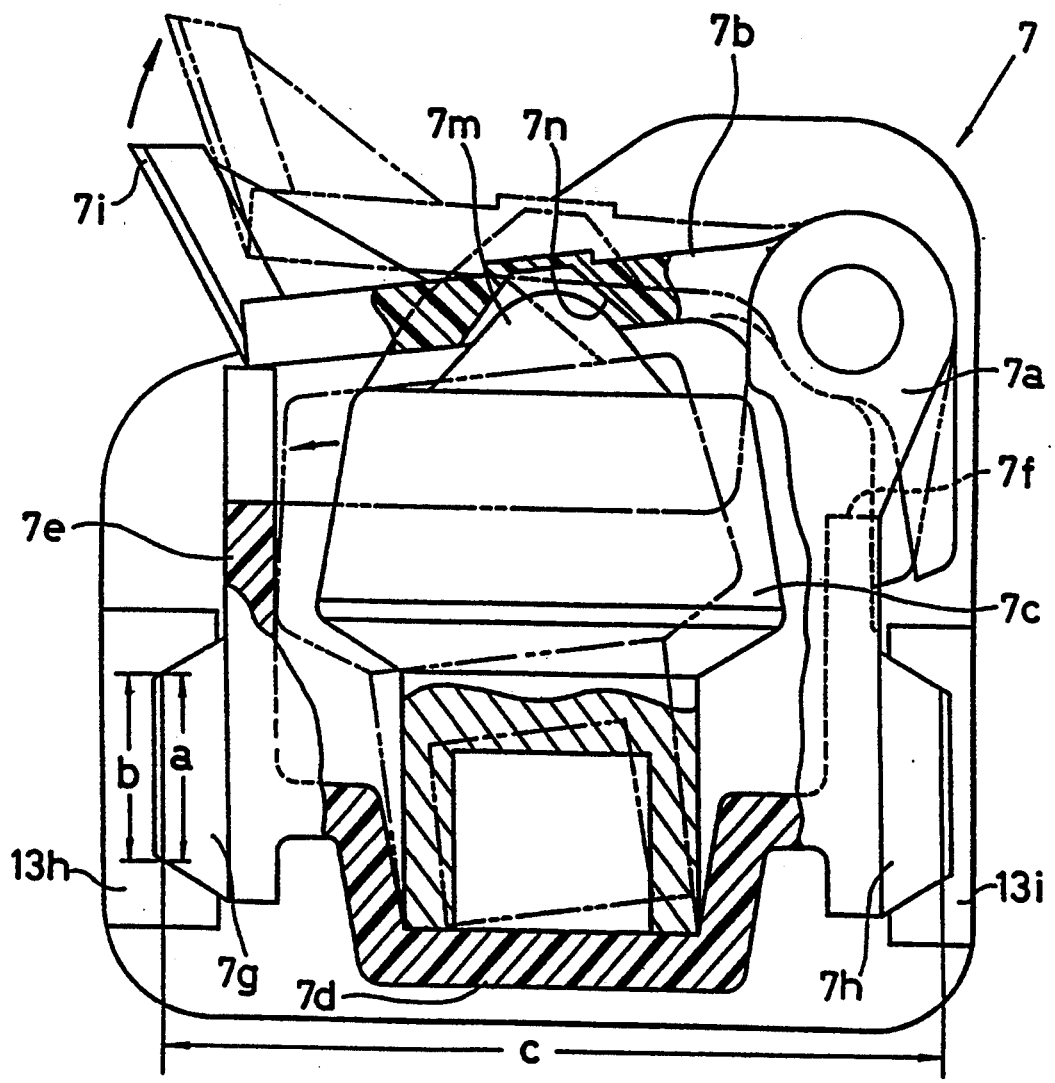
FIG. 22 is a partly-cutaway side view of a deceleration sensing means employed in the embodiment.

As shown in FIG. 22, the deceleration sensing means 7 has a casing 7a, a lever 7b which is pivotably supported by the casing 7a, and an inertia member 7c which is accommodated in the casing 7a so that when the vehicle is in a normal state, the inertia member 7c is in the position shown by the solid line, whereas, when deceleration exceeding a predetermined value acts on the vehicle, the inertia member 7c tilts to the position shown by the two-dot chain line.

Figure 23B:
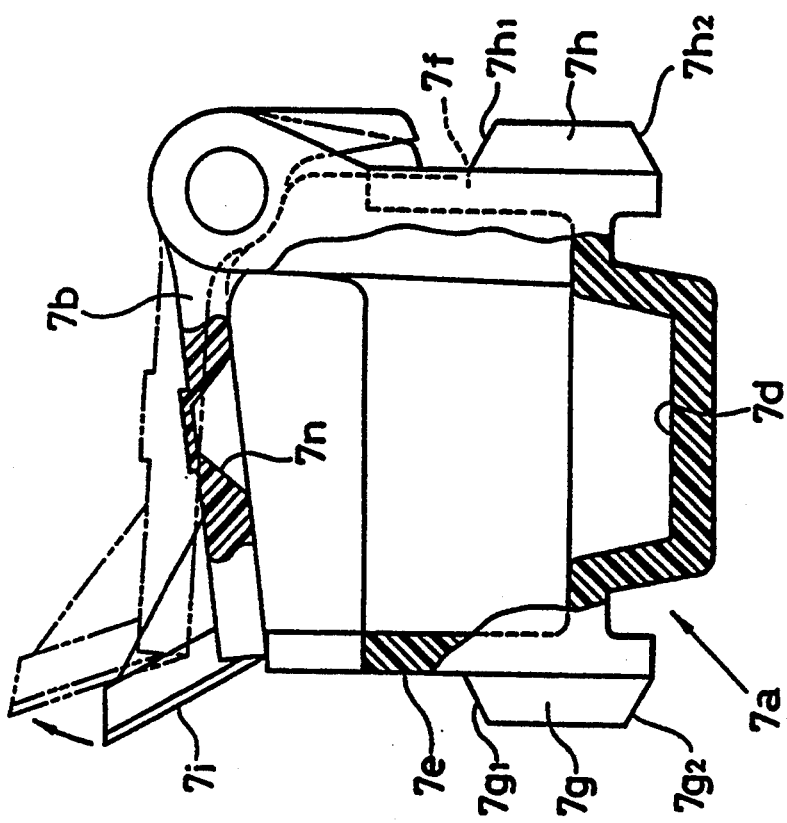
FIG. 23(b) is a partly-cutaway side view of the deceleration sensing means as seen from the right-hand side thereof.
Figure 23A:
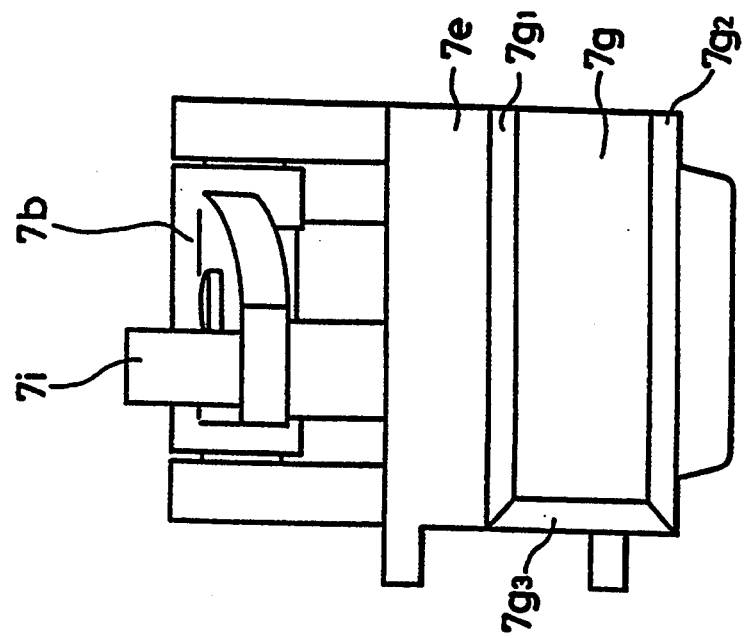
FIG. 23(a) is a front view thereof.

As shown in FIG. 23, the casing 7a is formed in the shape of a container having a rectangular cross-sectional configuration. The bottom of the casing 7a is formed as a portion 7d where the inertia member 7c is mounted. The front and rear walls 7e and 7f of the casing 7a are formed with respective engagement ridges 7g and 7h each having a trapezoidal cross-sectional configuration. More specifically, the engagement ridges 7g and 7h have side walls $7g_1$, $7g_2$, $7h_1$ and $7h_2$ which are formed as slant surfaces having the same slope angle as that of the side walls $13j_1$, $13j_2$, $13k_1$ and $13k_2$ of the recesses 13j and 13k of the guide members 13h and 13i. As will be clear from FIG. 23(a), one longitudinal end of the engagement ridge 7g is formed in the shape of a slant surface $7g_3$. Similarly, one longitudinal end of the other engagement ridge 7h is formed in the shape of a slant surface, although not shown. These engagement ridges 7g and 7h are fitted into the recesses 13j and 13k of the guide members 13h and 13i of the lock gear first cover 13.

The lever 7b is pivotably supported at the rear end thereof by the casing 7a. The forward end of the lever 7b is provided with a pawl 7i which is engageable with a tooth c of the lock gear 14.

Figure 24C:
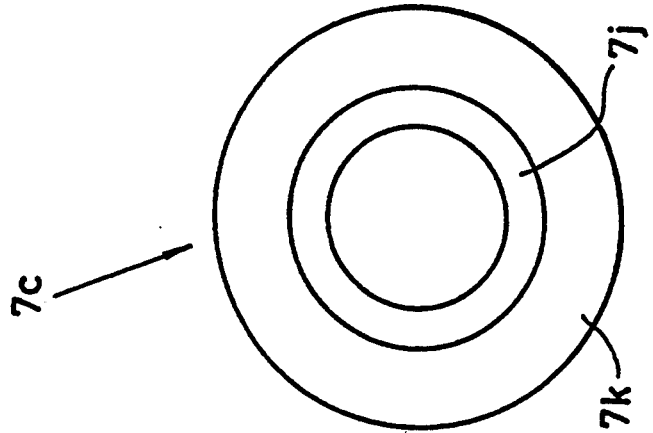
FIG. 24(c) is a bottom view of the inertia member.
Figure 24B:
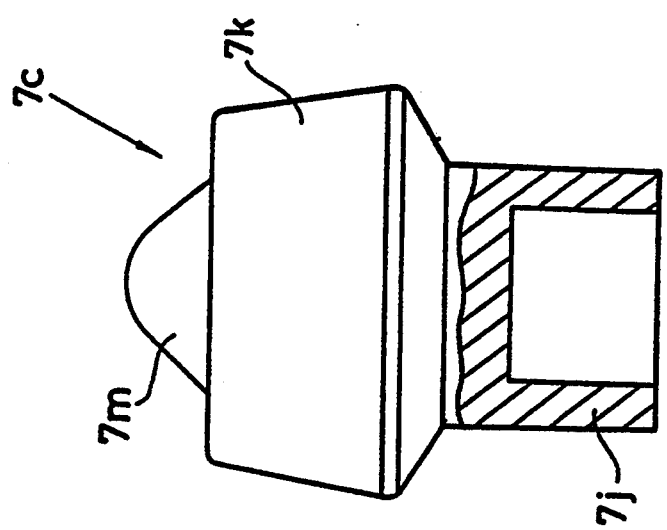
FIG. 24(b) is a partly-cutaway front view of the inertia member.
Figure 24A:
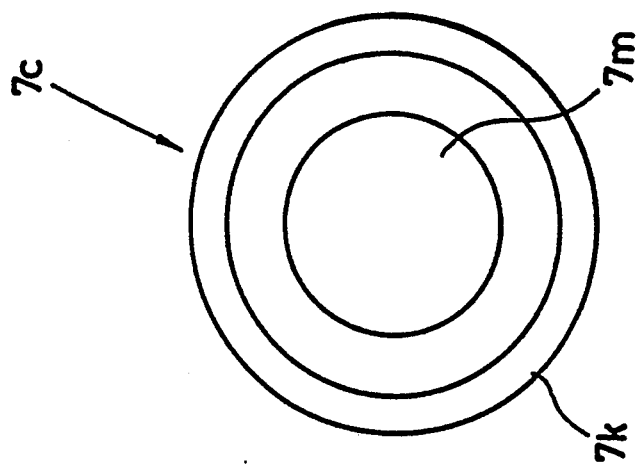
FIG. 24(a) is a plan view of the inertia member.

As shown in FIG. 24, the inertia member 7c has a hollow cylinder-shaped small-mass portion 7j formed at the bottom thereof. The inertia member 7c further has a solid frustoconical large-mass portion 7k formed on the upper end of the small-mass portion 7j. The large-mass portion 7k has a larger diameter than that of the small-mass portion 7j. The angle of slope of the outer peripheral surface of the large-mass portion 7k is set so that when the inertia member 7c tilts to a maximum degree, as described later, it substantially coincides with the inner surface of the front wall 7e. In addition, a conical actuating projection 7m is formed on the upper end of the large-mass portion 7k. By forming the inertia member 7c so that the top thereof has a larger mass than that of the bottom thereof, as described above, the inertia member 7c can sense deceleration even more sensitively.

As shown in FIG. 22, the inertia member 7c, which is arranged as described above, is mounted in the mounting portion 7d of the casing 7a. In a normal state, the inertia member 7c mounted in the mounting portion 7d erects perpendicularly to the mounting portion 7d, as shown by the solid line, and the upper end of the actuating projection 7m formed at the top of the inertia member 7c fits in a frustoconical recess 7n formed in the lever 7b. In the normal state, the lever 7b is held in a substantially horizontal position shown by the solid line. In this solid-line position, the lever 7b is placed in a non-engaging position where the pawl 7i does not engage with a tooth 14c of the lock gear 14.

When a predetermined degree of deceleration acts on the vehicle, the inertia member 7c tilts until the outer peripheral surface of the large-mass portion 7k substantially abuts on the inner surface of the front wall 7e, as shown by the two-dot chain line. The tilting of the inertia member 7c causes the actuating projection 7m to push up the lever 7b. Accordingly, the lever 7b pivots to the position shown by the two-dot chain line. In the two-dot chain line position, the lever 7b assumes an engageable position where the pawl 7i is engageable with a tooth 14c of the lock gear 14.

Incidentally, the inertia member 7c is provided with the actuating projection 7m, and by virtue of the presence of the actuating projection 7m, it is possible to obtain a relatively large stroke of the lever 7b with a relatively small angle of inclination of the inertia member 7c. Thus, it is possible to shorten the length of the arm of the lever 7b and hence form the deceleration sensing means 7 in a compact structure.

The deceleration sensing means 7, arranged as described above, is accommodated in the accommodating portion 13g by longitudinally fitting the engagement ridges 7g and 7h into the respective recesses 13j and 13k of the guide members 13h and 13i, which are provided in the accommodating portion 13g, as shown in FIG. 22. At this time, the engagement ridges 7g and 7h can be smoothly fitted into the recesses 13j and 13k because one end of each of the engagement ridges 7g and 7h is formed in the shape of a slant surface, as described above.

In addition, the distance a between the upper and lower side walls $7g_1$, $7g_2$, $7h_1$ and $7h_2$ at the respective projecting ends of the engagement ridges 7g and 7h is set longer than the distance b between the upper and lower side walls $13j_1$, $13j_2$, $13k_1$ and $13k_2$ of the recesses 13j and 13k at the respective positions corresponding to the projecting end positions of the engagement ridges 7g and 7h. When the engagement ridges 7g and 7h are fitted to the recesses 13j and 13k, the casing 7a is supported by the guide members 13h and 13i relatively rigidly by virtue of the elastic force derived from the elastic deformation of the accommodating portion 13g and the casing 7a. In particular, since the side walls of the engagement ridges 7g and 7h and those of the recesses 13j and 13k are formed in the shape of slant surfaces, wedge effect is obtained between the guide members 13h and 13i and the engagement ridges 7g and 7h, so that the casing 7a is supported by the guide members 13h and 13i even more rigidly.

Figure 25A:
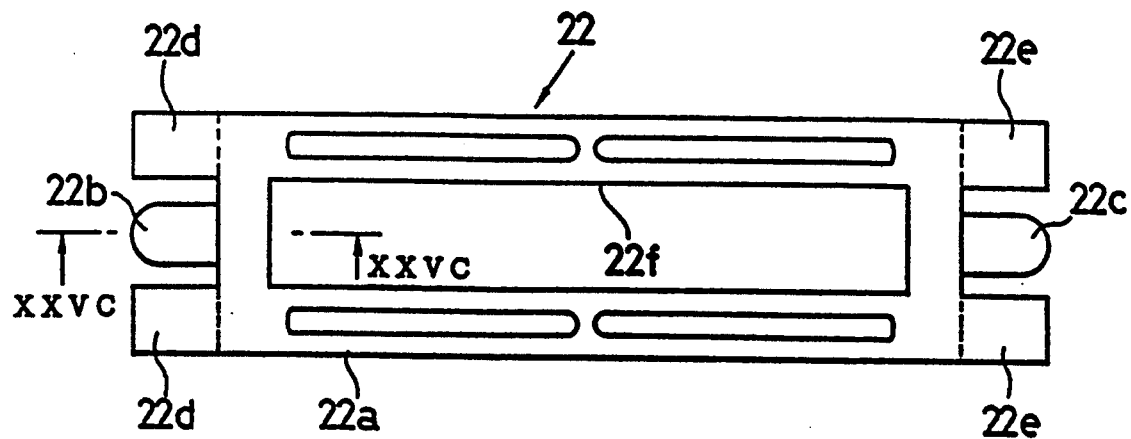
FIG. 25(a) is a plan view of the webbing guide.
Figures 25B, 25C:
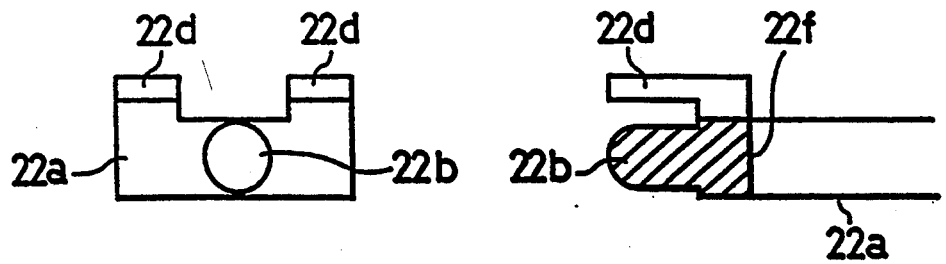
FIG. 25(b) is a side view of the webbing guide as seen from the left-hand side thereof.
FIG. 25(c) is a sectional view taken along the line XXVC—XXVC in FIG. 25(a).

As shown in FIG. 25, the webbing guide 22 has a body 22a which is disposed in between the two side walls 2a and 2b of the frame 2 and which has in its center a hole 22f that is pierced with the webbing 3. The webbing guide 22 further has shafts 22b and 22c which project longitudinally from two longitudinal ends, respectively, of the body 22a and which are slidably fitted into the respective guide holes 2p and 2q of the two side walls 2a and 2b. In addition, the webbing guide 22 has flange-shaped guide portions 22d and 22e which similarly project longitudinally from the two ends of the body 22a and which abut on the respective upper end surfaces of the side walls 2a and 2b.

The webbing guide 22 slides along the guide holes 2p and 2q of the side walls 2a and 2b in accordance with the webbing take-up position that changes with the roll diameter of the webbing 3 taken up on the reel shaft 4, thereby guiding the webbing 3 along the axis of the hole 22f at all times. Thus, the guide angle of the webbing 3 with respect to the webbing guide 22 is maintained at a substantially constant level, thereby allowing the webbing 3 to be smoothly wound up and unwound and also protected from rubbing against the webbing guide 22.

Since the guide portions 22d and 22e abut on the upper end surfaces of the two side walls 2a and 2b at all times, the webbing guide 22 will not rotate to tilt when the webbing 3 is wound up and unwound. In other words, the guide portions 22d and 22e constitute the rotation preventing means of the present invention. Accordingly, the webbing guide 22 can slide smoothly along the guide holes 2p and 2q, and the webbing 3 can be wound up and unwound even more smoothly. In addition, when the webbing guide 22 slides, the right and left end walls 22g and 22h of the body 22a are guided by the respective inner surfaces of the two side walls 2a and 2b of the frame 2. Therefore, the webbing guide 22 is also prevented from rotating about an axis extending parallel to the planes of the side walls 2a and 2b. Accordingly, the webbing guide 22 can slide along the guide holes 2p and 2q even more smoothly.

Next, the operations of the main pawl 17 and the backup pawl 20 will be explained in detail with reference to FIGS. 26A and 26B. It should be noted that in each of FIGS. 26A and 26B, the upper part (I) shows the operation of the main pawl 17, whereas the lower part (II) shows the operation of the backup pawl 20. In addition, FIGS. 26A and 26B are schematic views in which the teeth 2f, the teeth 17d and the three cam holes 14k, 14m and 14n on the main pawl (17) side are illustrated on the same plane, and in which both the main pawl 17 and the backup pawl 20 are seen from the right-hand side as viewed in FIG. 1C.

Referring to FIG. 26A, the reel shaft 4 (in FIG. 26A are shown only the through-hole 4m, which is pierced with the body 19a of the joint pin 19, and the main pawl 17, which is provided on the reel shaft 4) is constantly biased in the direction β relative to the lock gear 14 (in FIG. 26A are shown only the cam holes 14k, 14m and 14n) by the spring force of the pawl spring 18 (not shown in FIG. 26A; see FIG. 1A, for example). Therefore, the reel shaft 4 rotates in the direction β relative to the lock gear 14 until the body 19a abuts on the upper end edge of the cam hole 14k, thus reaching a normal state as shown in FIG. 26A(a).

In the normal state, the cam follower 19c of the joint pin 19 abuts on the upper end edge of the cam hole 14m, and the cam follower 17f of the main pawl 17 abuts on the upper end edge of the cam hole 14n. In addition, the teeth 17d of the main pawl 17 are far apart from the teeth 2f of the right-hand side wall 2a, so that the main pawl 17 assumes a non-engaging position where the teeth 17d do not engage with the teeth 2f. On the other hand, the backup pawl 20 assumes the position shown in FIG. 26A(a) in accordance with the angle of rotation of the joint pin 19 that is determined by positions at which the cam followers 19c and 17f abut on the respective upper end edges of the cam holes 14m and 14n. That is, the teeth 20d of the backup pawl 20 are far apart from the teeth 2g of the left-hand side wall 2b, so that the backup pawl 20 also assumes a non-engaging position where the teeth 20d do not engage with the teeth 2g.

When the reel shaft 4 rotates in the direction α relative to the lock gear 14 about the first rotating shaft 4d (not shown in FIG. 26A; see FIG. 7), that is, when the through-hole 4m, which is pierced with the body 19a, rotates in the direction α relative to the first to third cam holes 14k, 14m and 14n of the lock gear 14 about the first rotating shaft 4d, the body 19a and the boss portion 17b of the main pawl 17 move a little downwardly along and relative to the first cam hole 14k, as shown in FIG. 26A(b).

At the same time, the cam follower 17*f* moves a little downwardly by being guided by the third cam hole 14*n*. At this time, the boss portion 17*b* also moves a little leftwardly as viewed in the FIGURE in accordance with the cam profile of the first cam hole 14*k*, and the cam follower 17*f* moves a little leftwardly in accordance with the cam profile of the third cam hole 14*n*. Since the amount of the leftward movement of the cam follower 17*f* is a little larger than that of the boss portion 17*b*, the main pawl 17 pivots a little in the direction β. Thus, the teeth 17*d* approach the teeth 2*f*.

Further, at the same time, the cam follower 19*c* moves downwardly by being guided by the second cam hole 14*m*. Since the cam follower 19*c* also moves rightwardly in accordance with the cam profile of the second cam hole 14*m*, the arm 19*b* pivots a little in the direction α about the body 19*a*. The pivoting motion of the arm 19*b* in the direction α causes the body 19*a* to rotate also a little in the direction α. However, since the reel shaft 4 also rotates in the direction α, the body 19*a* and the arm 19*b* do not substantially rotate relative to the reel shaft 4. Accordingly, the backup pawl 20 is held in the non-engaging position, as shown in FIG. 26A (*b*).

Referring next to FIG. 26A(*c*), when the reel shaft 4 further rotates in the direction α relative to the lock gear 14, the body 19*a* and the boss portion 17*b* further move downwardly and leftwardly along the first cam hole 14*k*. At the same time, the cam follower 17*f* further moves a little downwardly by being guided by the third cam hole 14*n*. Since the amount of the further leftward movement of the cam follower 17*f* is a little larger than that of the boss portion 17*b*, the main pawl 17 further pivots a little in the direction β, so that the teeth 17*d* begin to engage with the teeth 2*f*.

Further, at the same time, the cam follower 19*c* further moves a little downwardly and leftwardly by being guided by the second cam hole 14*m*. At this time, since the cam follower 19*c* also moves a little downwardly and leftwardly in accordance with the cam profile of the second cam hole 14*m*, the arm 19*b* does not substantially pivot. However, since the reel shaft 4 further moves in the direction α, the body 19*a* and the arm 19*b* rotate in the direction β relative to the reel shaft 4. Thus, the backup pawl 20 pivots a little in the direction β relative to the reel shaft 4, so that the teeth 20*d* approach the teeth 2*g*.

Referring to FIG. 26A(*d*), when the reel shaft 4 further rotates in the direction α relative to the lock gear 14, the main pawl 17 further pivots a little in the direction β relative to the reel shaft 4 in the same way as the above, so that the teeth 17*d* engage with the teeth 2*f* to a substantial degree. Similarly, the backup pawl 20 further pivots a little in the directions, so that the teeth 20*d* begin to engage with the teeth 2*g*. Thus, the engagement of the teeth 20*d* of the backup pawl 20 with the teeth 2*g* begins with a little delay with respect to the engagement of the teeth 17*d* of the main pawl 17 with the teeth 2*f*.

Referring to FIG. 26B(*e*), when the reel shaft 4 further rotates in the direction α relative to the lock gear 14, the main pawl 17 and the backup pawl 20 further pivot in the direction β relative to the reel shaft 4 in the same way as the above. Accordingly, the amount to which the teeth 17*d* engage with the teeth 2*f* increases, and so does the amount of engagement of the teeth 20*d* with the teeth 2*g*.

As shown in FIG. 26B(*f*), when the reel shaft 4 further rotates in the direction α relative to the lock gear 14, the teeth 17*d* engage with the teeth 2*f* almost completely, while the amount of engagement of the teeth 20*d* with the teeth 2*g* further increases.

As shown in FIG. 26B(*g*), when the reel shaft 4 further rotates in the direction α relative to the lock gear 14, the teeth 17*d* become completely engaged with the teeth 2*f*. Thus, the main pawl 17 completely engages with the teeth 2*f* of the right-hand side wall 2*a*. On the other hand, the teeth 20*d* engage with the teeth 2*f* almost completely.

As shown in FIG. 26B(*h*), when the reel shaft 4 further rotates in the direction α relative to the lock gear 14, the complete engagement between the teeth 17*d* and 2*f* is maintained, while the backup pawl 20 becomes completely engaged with the teeth 2*g* of the left-hand side wall 2*b*.

Thus, in this embodiment, when the reel shaft 4 rotates in the direction α relative to the lock gear 14, the teeth 17*d* of the main pawl 17 first begin to engage with the teeth 2*f* of the right-hand side wall 2*a*, and then the teeth 20*d* of the backup pawl 20 begin to engage with the teeth 2*g* of the left-hand side wall 2*b* with a little delay. Accordingly, after the teeth 17*d* have become completely engaged with the teeth 2*f*, the teeth 20*d* engage completely with the teeth 2*g* with a little delay. Therefore, at least either the engagement between the main pawl 17 and the teeth 2*f* or the engagement between the backup pawl 20 and the teeth 2*g* is surely made without an engagement failure.

Next, the operation of the seat belt retractor in this embodiment, arranged as described above, will be explained. [Normal state where no deceleration exceeding a predetermined value acts on the vehicle]

In this state, the inertia member 7*c* of the deceleration sensing means 7 does not tilt forwardly. Therefore, the lever 7*b* is held in the solid-line position as shown in FIG. 2, and the pawl 7*i* is placed in the nonengaging position, which is apart from the teeth 14*c* of the lock gear 14. Similarly, the pawl 15*c* of the inertia member 15, the main pawl 17 and the backup pawl 20 are held in the respective non-engaging positions, as shown in FIGS. 2 and 4.

Accordingly, in this state the seat belt retractor 1 mainly performs an operation based on the action of the biasing force application means 5. That is, the reel shaft 4 is biased in the webbing winding direction β by the spring force of the power spring 8 so as to wind up the webbing 3. In this state, the roll diameter of the webbing 3 on the reel shaft 4 is at a maximum. Accordingly, the webbing guide 22 is disposed at the right extremity of the stroke thereof as viewed in FIG. 2. (When the seat belt is not fastened to the occupant's body)

In this state, a tongue (not shown), which is attached to the webbing 3, is separate from a buckle member (not shown). Accordingly, the webbing 3 has been wound up by the spring force of the power spring 8, as described above. (When the webbing is unwound)

When the occupant unwinds the webbing 3 in order to fasten it to his/her body, the reel shaft 4 and the bush 9 rotate in the webbing unwinding direction α in response to the unwinding of the webbing 3. Consequently, the power spring 8 is gradually wound up. At this time, the roll diameter of the webbing 3 on the reel shaft 4 decreases in accordance with the length to which the webbing 3 is unwound. As the roll diameter of the webbing 3 decreases, the position at which the webbing 3 is pulled out from the seat belt retractor 1 shifts leftwardly as viewed in FIG. 2. Therefore, the webbing guide 22 also moves leftwardly as viewed in FIG. 2 in accordance with the change of the webbing pull-out position. (When the occupant takes his/her hand off the webbing after connecting together the tongue and the buckle member)

At the time when the occupant connects together the tongue and the buckle member, the webbing 3 has been unwound in excess of the length of the webbing 3 unwound when the occupant has it fastened to his/her body in a normal state. Therefore, when the occupant takes his/her hand off the webbing 3 after connecting together the tongue and the buckle member, the webbing 3 is wound up by the spring force of the power spring 8 until it fits to the occupant's body. The spring force of the power spring 8 is properly determined in advance so that the webbing 3 will not give a sensation of pressure to the occupant. During the webbing winding operation by the force from the power spring 8, the position at which the webbing 3 is pulled out from the seat belt retractor 1 shifts rightwardly as viewed in FIG. 2, and the webbing guide 22 also moves rightwardly as viewed in FIG. 2 in accordance with the change of the webbing pull-out position.

During the running of the vehicle, the seat belt retractor 1 maintains this state unless deceleration exceeding a predetermined value acts on the vehicle. However, the webbing 3 can be unwound freely in response to normal forward movement of the occupant's body. Therefore, the occupant can adjust his/her seating position freely. The normal forward movement of the occupant's body also causes a leftward shift of the position at which the webbing 3 is pulled out from the seat belt retractor 1. Therefore, the webbing guide 22 also moves leftwardly as viewed in FIG. 2 in accordance with the change of the webbing pull-out position. [When deceleration exceeding a predetermined value acts on the vehicle]

When deceleration exceeding a predetermined value acts on the vehicle during the running due to a sudden braking operation or other emergency operation, both the seat belt lock activating means 6 and the deceleration sensing means 7 operate. As a first stage of the operation, the inertia member 7c of the deceleration sensing means 7 moves forwardly (the position shown by the two-dot chain line in FIG. 2) by inertia, so that the lever 7b pivots upwardly to reach the position shown by the two-dot chain line in FIG. 2. Consequently, the pawl 7i of the lever 7b assumes an engageable position where it is engageable with a tooth 14c of the lock gear 14. In the meantime, the occupant's body is urged to move forwardly by the deceleration acting on the vehicle to a degree higher than a predetermined value, thus causing the webbing 3 to be unwound. The unwinding of the webbing 3 causes both the reel shaft 4 and the lock gear 14 to rotate in the unwinding direction α.

However, since a tooth 14c of the lock gear 14 engages with the pawl 7i immediately, the lock gear 14 is immediately stopped from rotating in the unwinding direction α. As a result, the reel shaft 4 alone continuously rotates in the unwinding direction α. Thus, the reel shaft 4 rotates in the direction α relative to the lock gear 14.

The relative rotation of the reel shaft 4 in the direction αcauses the main pawl 17 to pivot in the direction β relative to the reel shaft 4 and to engage with the teeth 2f, and thereafter, with a little delay, the backup pawl 20 pivots in the direction β relative to the reel shaft 4 and engages with the teeth 2g, as a second stage of the operation, as shown in FIGS. 26A and 26B. Thus, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. At this time, since the webbing 3 is not unwound substantially, the webbing guide 22 does not move substantially, either.

Accordingly, the teeth 2f and 2g of the frame 2, the main pawl 17 and the backup pawl 20 constitute in combination the lock means of the present invention, and the lock gear 14 constitutes the lock activating means of the present invention. [When unwinding force suddenly acts on the webbing]

When such a situation occurs, the webbing 3 is suddenly unwound, so that the reel shaft 4, the lock gear 14 and the inertia member 15 are suddenly urged to rotate in the webbing unwinding direction α. However, since the spring force of the control spring 16 is not so strong, the control spring 16 contracts, so that the inertia member 15 has an inertia delay. That is, the inertia member 15 not only revolves in the webbing unwinding direction α together with the lock gear 14 but also rotates in the direction relative to the lock gear 14.

The rotation of the inertia member 15 causes the pawl 15c to move to the engageable position, where it abuts on the second stopper 14i, and engage with the teeth 13c of the lock gear first cover 13, as shown by the two-dot chain line in FIG. 2. Consequently, the revolution of the inertia member 15 and the rotation of the lock gear 14 in the webbing unwinding direction α are stopped. Accordingly, the reel shaft 4 alone rotates in the webbing unwinding direction α. Thus, the reel shaft 4 rotates in the direction α relative to the lock gear 14, as described above.

The relative rotation of the reel shaft 4 in the direction α causes the main pawl 17 to pivot and engage with the teeth 2f, and thereafter, with a little delay, the backup pawl 20 engages with the teeth 2f, in the same way as the above. Thus, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. At this time also, since the webbing 3 is not unwound substantially, the webbing guide 22 does not move substantially, either.

It should be noted that the present invention is not necessarily limited to the above-described embodiment and that various changes and modifications may be imparted thereto. For example, although in the foregoing embodiment the present invention is applied to a seat belt retractor of the type in which the main pawl 17 and the backup pawl 20, which are respectively provided on the flanges 4b and 4c at both ends of the reel shaft 4, are engaged with the corresponding teeth formed on the frame 2, it should be noted that the present invention may also be applied to any other type of seat belt retractor.

As will be clear from the foregoing description, according to the seat belt retractor of the present invention, the webbing guide moves in accordance with the change of the webbing take-up position. Accordingly, the webbing can be guided smoothly by the webbing guide, and it is also possible to prevent reliably the webbing from being rubbed against the webbing guide.

Further, according to the present invention, the rotation preventing means prevents rotation of the webbing guide during movement thereof. Therefore, the guide angle of the webbing with respect to the webbing guide can be maintained at a constant level even more effectively.

What we claim is:

1. A seat belt retractor for a vehicle including a reel shaft for winding up a webbing, a frame formed in a U-shape with a pair of left and right side walls rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and means for activating said lock means in response to the operation of said deceleration sensing means, wherein the improvement comprises elongated guide holes formed in said left and right side walls, respectively, of said frame, a webbing guide having an elongated opening for guided passage of said webbing, and pin means on said webbing guide at opposite ends thereof slidable received in said elongated guide holes for mounting said webbing guide on said frame so as to maintain said opening substantially parallel to said reel shaft and linearly movable in accordance with a change of position at which said webbing extends outwardly from said frame and which changes in accordance with changes in the reel diameter of said webbing taken up on said reel shaft.

2. A seat belt retractor according to claim 1 including means remote from said pin means and slidably engaging said frame for preventing said webbing guide from rotating relative to said frame about an axis intersection perpendicularly to planes of said left and right side walls.

3. A seat belt retractor according to claim 2, wherein said rotation preventing means comprises a guide flange which is provided on at least either one of left and right ends of said webbing guide so as to slidably abut on the upper end of at least either one of said left and right side walls.

* * * * *